US012136320B2

(12) United States Patent
Mande et al.

(10) Patent No.: US 12,136,320 B2
(45) **Date of Patent: *Nov. 5, 2024**

(54) NO-DOWNTIME UNIVERSAL UTILITY CASSETTE FOR RECIRCULATION IN MULTIPLE SYSTEMS

(71) Applicant: Wells Fargo Bank, N.A., San Francisco, CA (US)

(72) Inventors: Christian Mande, Charlotte, NC (US); Darren Goetz, Salinas, CA (US); Frank Digangi, San Francisco, CA (US); Dennis Montenegro, Concord, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/232,213

(22) Filed: Aug. 9, 2023

(65) Prior Publication Data

US 2023/0386304 A1 Nov. 30, 2023

Related U.S. Application Data

(63) Continuation of application No. 17/888,174, filed on Aug. 15, 2022, now Pat. No. 11,741,796, which is a continuation of application No. 17/349,692, filed on Jun. 16, 2021, now Pat. No. 11,417,178.

(51) Int. Cl.
*G07F 19/00* (2006.01)

(52) U.S. Cl.
CPC .......... *G07F 19/203* (2013.01); *G07F 19/202* (2013.01)

(58) Field of Classification Search
CPC ............................ G07F 19/203; G07F 19/202
USPC ........................................................ 235/7 R
See application file for complete search history.

(56) References Cited

U.S. PATENT DOCUMENTS 9,117,327 B1 8/2015 Wasil et al.
9,530,288 B2 12/2016 Conrath
9,594,954 B1 3/2017 Walker et al.
10,235,660 B1 3/2019 Bueche et al.
10,289,987 B1 5/2019 Walker et al.
10,540,644 B1 1/2020 Walker et al.
(Continued)

FOREIGN PATENT DOCUMENTS

WO WO-96/36933 A1 11/1996
WO WO-97/43734 A1 11/1997
(Continued)

*Primary Examiner* — Daniel A Hess
(74) *Attorney, Agent, or Firm* — Foley & Lardner LLP

(57) ABSTRACT

A utility device for receiving and dispensing bills is disclosed. The utility device includes a sensor structured to detect at least one parameter associated with the bills received by the utility device, a cleaning component structured to perform a cleaning operation on one or more of the bills received by the utility device, and memory having instructions stored thereon that, when executed by one or more processors, cause the one or more processors to perform a utility operation comprising receiving data from the sensor regarding the at least one parameter, and selectively causing the cleaning component to perform the cleaning operation on one or more of the bills received by the utility device from a cash-bearing component based on at least the data and a location of the utility device.

16 Claims, 9 Drawing Sheets

(56) References Cited

U.S. PATENT DOCUMENTS

| | | | | |
|---|---|---|---|---|
| 10,825,004 | B1 | 11/2020 | Walker et al. | |
| 10,825,005 | B1 | 11/2020 | Walker et al. | |
| 11,417,178 | B1 * | 8/2022 | Mande | G07F 19/203 |
| 11,741,796 | B1 * | 8/2023 | Mande | G07F 19/203<br>235/7 R |
| 2021/0035101 | A1 | 2/2021 | Pham et al. | |

FOREIGN PATENT DOCUMENTS

| | | | |
|---|---|---|---|
| WO | WO-99/41695 | A1 | 8/1999 |
| WO | WO-2018/205098 | A1 | 11/2018 |

* cited by examiner

NO-DOWNTIME UNIVERSAL UTILITY CASSETTE FOR RECIRCULATION IN MULTIPLE SYSTEMS

CROSS-REFERENCE TO RELATED APPLICATIONS

This application is a Continuation of U.S. patent application Ser. No. 17/888,174, filed Aug. 15, 2022, which is a continuation of U.S. patent application Ser. No. 17/349,692 filed Jun. 16, 2021, now U.S. Pat. No. 11,417,178, each of which are incorporated herein by reference in their entirety and for all purposes.

TECHNICAL FIELD

The present disclosure relates to systems and methods for a no-downtime universal utility cassette for recirculation in multiple systems.

BACKGROUND

Bill handling machines, such as automated teller machines (ATMs) or cash recycling units at teller stations (e.g., at a financial institution), often utilize cassettes to store bills (e.g., currency, bank notes, etc.). Each of the series of cassettes can be configured to store a particular denomination or type of bill, and may be structured to receive or dispense bills in response to a transaction. An ATM user may withdraw bills from the ATM by entering account information, a bank card, an amount to withdraw, etc., and the ATM may retrieve appropriate bills from one or more cassettes. A teller operating a teller station may deposit bills into the teller station, and these bills may be routed into appropriate cassettes.

The cassettes utilized by ATMs, teller stations, point-of-sale (POS) systems, etc., may be unique to the particular model or type of device, and therefore may not be compatible with other styles, models, or types of devices. A cassette used in a particular model of ATM may not be compatible with a teller station, or vice versa. Additionally, cassettes may lack smart programmable functionality or features and/or utility features.

SUMMARY

At least one arrangement relates to a utility device for receiving and dispensing bills. The utility device includes a first sensor structured to detect at least one parameter associated with the bills received by the utility device. The utility device also includes a cleaning component structured to perform a cleaning operation on one or more of the bills received by the utility device. The utility device also includes memory having stored thereon instructions that, when executed by one or more processors, cause the one or more processors to perform a utility operation. The utility operation includes receiving quality data from the first sensor. The quality data includes the at least one parameter. The operation also includes transmitting the quality data to a remote computing device. The operation also includes selectively causing the cleaning component to perform the cleaning operation on one or more of the bills received by the utility device based on at least the quality data. The bills may be received from a cash-bearing cassette and may represent a subset of bills in the cash-bearing cassette, such that the cash-bearing cassette remains operational throughout the cleaning operation. The operation also includes, in response to completing the utility operation, transmitting a notification to the remote computing device.

Another arrangement relates to a method. The method includes installing a utility device to a host device such that the utility device and the host device are communicatively coupled and a bill interface is formed therebetween. The bill interface is structured to facilitate transporting at least one bill of a plurality of bills between the utility device and the host device. The method also includes receiving, by the utility device, a first data packet from the host device. The first data packet includes a fill level of the host device. The method also includes transmitting, by the utility device, a second data packet to a remote computing device. The second data packet includes a location of the utility device and the fill level of the host device. The method also includes performing, by the utility device, a utility operation. The utility operation includes receiving at least one bill of the plurality of bills from the host device via the bill interface. The operation also includes detecting, by at least one sensor, at least one parameter of a plurality of at least one parameter for a received bill. The operation also includes selectively performing, by a cleaning component, a cleaning operation for the received bill. The bill may be received from a cash-bearing cassette and may represent a subset of bills in the cash-bearing cassette, such that the cash-bearing cassette remains operational throughout the cleaning operation. The operation also includes transmitting a notification to the remote computing device. The notification indicates that the utility operation is completed.

Another arrangement relates to a non-transitory computer readable medium having computer-executable instructions embodied therein that, when executed by at least one processor of a computing system, cause the computing system to perform operations for a multi-device recycling system. The operations include communicatively coupling a utility device to a host device responsive to installing the utility device to the host device. The operations also include receiving a first data packet comprising a location of the utility device and a fill level of the host device. The operations also include determining, based on the first data packet, a utility operation to be performed by the utility device. The operations also include causing the host device to transfer a plurality of bills from at least one universal cassette to the utility device. The operations also include causing the utility device to perform the utility operation on the plurality of bills. The utility operation includes one of a cleaning operation and a quality operation. The cleaning operation is performed by a cleaning component of the utility device. The cleaning operation includes cleaning each bill of the plurality of bills. The cleaning operation also includes returning the plurality of bills to the host device. The quality operation includes detecting, by at least one sensor, a plurality of at least one parameter for each bill of the plurality of bills. The quality operation also includes identifying a first subset of bills of the plurality of bills. The first subset including bills has at least one parameter of the plurality of at least one parameter exceeding a parameter threshold. The quality operation also includes storing first subset of bills in a bill escrow area of the utility device. The quality operation also includes returning a second subset of bills to the host device, the second subset of bills different from the first subset. The operations also include receiving, from the utility device, a notification that the utility operation is complete. The bills on which the utility operation is performed may be received from a cash-bearing cassette and may represent a subset of bills in the cash-bearing cassette, such that the cash-bearing cassette remains operational throughout the cleaning operation.

This summary is illustrative only and is not intended to be limiting in any way. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
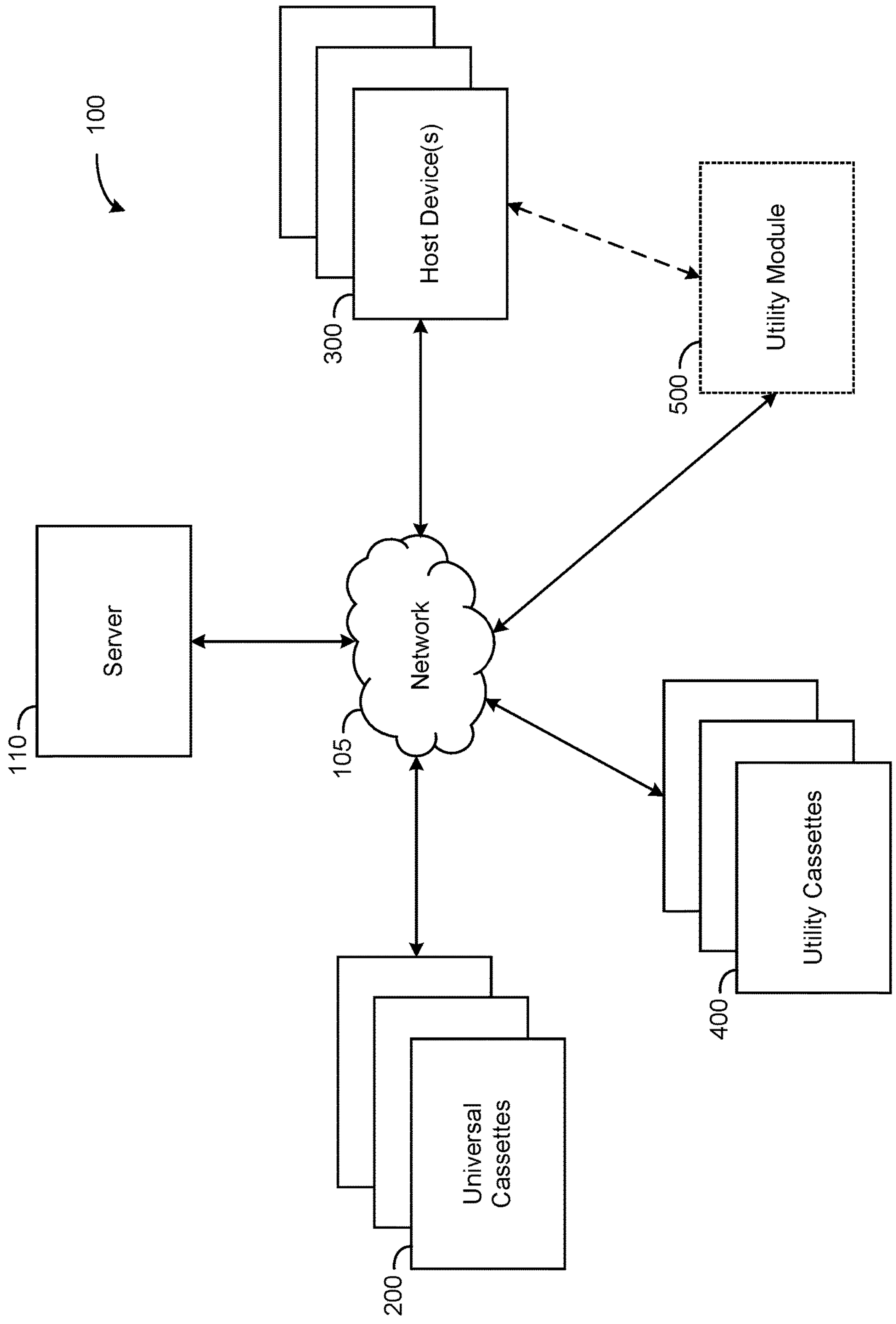
FIG. 1 is a block diagram of a cassette management system, according to an example arrangement.

Referring generally to the figures, utility devices for performing utility operations on bills in systems, such as teller stations, kiosks, automated teller machines, etc., are shown, according to various arrangements. The utility devices may include a utility cassette and/or a utility module. The systems may include host devices, cassettes for retrievably storing banknotes such as universal cassettes, and a cassette management system such as a remote computing system and/or a server for managing the system. The cassettes such as the universal cassettes and the utility cassettes described herein may be docked (i.e., installed, disposed within and/or communicatively coupled to) in the host devices or systems, including various models or types of ATMs, teller stations such as teller counters at banks, cash recyclers, POS systems, etc. In other words, both the universal cassettes and the utility cassettes may be "universal" in that they may be configured to function with a variety of systems.

A universal cassette and/or a utility cassette can include a control circuit, which may be embodiment within the cassette in whole or in part (e.g., as an integrated circuit, a system on a chip (SOC), a removable card, etc.). The control circuit can include one or more sensors for detecting bill quality, fill level, location, and various other parameters associated with operations of the universal cassette and/or the utility cassette. The universal cassette can be docked into a host device, such as an ATM, to facilitate the storage and retrieval of bills over a one or more transactions. The utility cassette can be docked into a host device, such as an ATM, to facilitate a utility operation such as cleaning bills or removing soiled, damaged, or destroyed bills. The universal cassette and/or the utility cassette may be communicatively and/or electronically coupled to the host device, and the universal cassette, the utility cassette, and/or the host device may be communicatively coupled to a central computing system (e.g., a remote server), such as a financial institution server.

Together, the universal cassettes, the utility cassettes, host devices, and central computing system may form a cassette management system capable of tracking fill levels, denominations, locations, and other information for one or more cassettes and of performing utility operations on bills stored by the system. In one example, a branch of a financial institution (e.g., a bank branch) may include at least one ATM and/or at least one teller station with a cash storage system configured to receive or dispense bills to a teller and/or a customer. Over time, the number of bills contained in the multiple cassettes of the ATM or a teller's station may gradually deplete as customers make withdrawals. In a similar manner, cassettes at the ATM or teller's station may fill over time, as customers make deposits. The filling and depletion of these cassettes may be tracked by the central computing system based on information provided by the cassettes themselves (e.g., via circuitry, including at least one of a fill sensor, processor, and memory), by the docking station (e.g., via circuitry, including at least one of a fill sensor, processor, and memory), and/or by at least one sensor positioned in the bill path. The information may include information regarding a cassette being full (e.g., the cassette which has filled over time) or empty (e.g., the cassette which as depleted over time), and the central computing system may identify a replacement cassette. In this example, the central computing system may determine that the empty ATM cassette may be replaced by the full teller station cassette or vice versa.

Upon determining that a first universal cassette requires replacement, the central computing system may identify, based on a current location of the first universal cassette, a denomination associated with the first universal cassette, and/or one or more other attributes of the first universal cassette, and a second, replacement universal cassette. In the example above, the central computing system may determine that the universal cassette(s) within an ATM is/are nearly empty, and may identify the universal cassette(s) within a teller station as a suitable replacement based on the proximity of the two host devices (e.g., both the ATM and the teller station being geographically located within a predetermined distance, at the same bank branch, etc.). The central computing system may generate a notification that is presented to a user (e.g., a bank employee) via a user device, such as a desktop computer or mobile device, which provides instructions for the user to swap the first and second cassettes, or at least to replace the first universal cassette with the second universal cassette. The user may then remove the first universal cassette from its host device and replace it with the second universal cassette.

In some arrangements, the cassette management system may continuously (e.g., every millisecond, every second, every minute, etc.) and/or periodically (e.g., every day, every week, etc.) determine if a utility operation such as cleaning bills or removal of defective bills is required at a particular host device. The cassette management system may determine that the utility operation needs to be performed based on a quantity of bills (e.g., of any denomination) received by the host device, an value of currency (e.g., including any amount of bills) received by the host device, one or more parameters (e.g., a quality of the bill, a cleanliness of the bill, an indication of whether the bill is torn, bent, or damaged) regarding bills received by the host device that were detected by one or more sensors, and the like. The central computing system may generate a notification that is presented to a user (e.g., a bank employee) via a user device, such as a computer or mobile device, which provides instructions for the user to provide a utility device (e.g., a utility cassette or a utility module) to the host device. The cassette management system may provide instructions to the utility device and/or the host device. The utility device and the host device may then perform the utility operation based on the instructions from the cassette management system including providing bills to the utility device, cleaning and/or removing bills, and selectively providing the bills back to the host device. One or more of the utility device, the host device, and the cassette management system may then provide an indication to the user (e.g., via the user device) that the utility operation is completed. The user may then remove the utility device from the host device. It will be appreciated that various other features and advantages of utility cassettes and the above-mentioned cassette management system will be described in greater detail below.

FIG. 1 is a block diagram of a cassette management system 100, according to an example arrangement. As described briefly above, the system 100 may be configured to track and/or manage a plurality of universal cassettes, such as by determining when one or more cassettes are full, near full, near empty, or empty, and subsequently identifying appropriate replacement cassettes or cassette swaps. Additionally and/or alternatively, the system 100 may be configured to track and/or manage a plurality of utility devices, such as by determining when a utility operation(s) is need at a host device, the parameters of the utility operation(s) (e.g., which bills require the utility operation, when to perform the utility operation, how often to perform the utility operation, the type of utility operation, and/or the duration of the utility operation), and providing instructions to the host device and/or utility device to perform the utility operation(s). In some arrangements, the system 100 is implemented at a single location (e.g., a particular branch of a financial institution, a retail store location, a grocery store location, and the like). In some arrangements, the system 100 may be implemented across multiple locations (e.g., across multiple branches or locations belonging to the same company). For example, the system 100 may be implemented to manage cassettes across all of the locations (e.g., branches) of a company within a geographical area.

As shown, the system 100 includes a network 105, a computing system, shown as server 110, currency storage and dispensing devices shown as universal cassettes 200, transaction devices shown as host device(s) 300, and utility devices shown as utility cassettes 400. In some arrangements, the system 100 may also include one or more additional utility devices shown as a utility module 500. The utility module 500 may be a mobile utility device that is operable to couple to an exterior surface of a host device 300 and perform utility operation(s). In some arrangements, the utility module 500 includes similar components as the utility cassettes 400. In some arrangements, the utility module 500 is a mobile docking station that houses one or more utility cassettes 400. The utility module 500 may be provided in addition to and/or instead of the utility cassettes 400.

As shown, each of the server 110, the universal cassettes 200, the host devices 300, the utility cassettes, and the utility module 500 may be communicatively coupled to the network 105 such that the network permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the server 110 and other computing systems associated with a business that operates the host devices 300 or with a customer of the business. The network 105 may include one or more of a cellular network, the Internet, Wi-Fi, Wi-Max, a proprietary provider network, a proprietary retail or service provider network, and/or any other kind of wireless or wired network. Specifically, the network 105 may be wired or wireless network (e.g., Internet, intranet, VPN, etc.) configured to exchange data, values, instructions, messages, and the like between the components of system 100. Accordingly, each of the server 110, the universal cassettes 200, the host devices 300, the utility cassettes 400, and the utility module 500 may include an appropriate wired or wireless communications interface (i.e., network adaptor) to facilitate this communication. For example, a telephone (e.g., cellular) network or a wired local network (e.g., LAN, WAN, etc.), a short-range, wireless network (e.g., WiFi, Bluetooth, etc.) and the like may be used. It will be appreciated that these example network types are not intended to be limiting, and that the network 105 may be configured as any appropriate type of network. Additionally, in some embodiments, the network 105 may include multiple types of networks.

In some arrangements, the network interface described above may be used to establish connections with other computing devices by way of the network 105. The network interface may include program logic that facilitates connection of the devices of the system 100 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the network interface may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

The server 110 may be a computing system for a particular company (e.g., a financial institution). In other words, the server 110 may be configured to receive, process, and/or transmit data from/to a variety of systems, subsystems, or devices, and accordingly may be able to perform a variety of calculations, processes, estimations, etc., using this data. As described in greater detail below with respect to FIG. 2, the server 110 may include a variety of components for executing instructions (e.g., via computer code) to perform these various actions. In some arrangements, the server 110 is hosted or maintained by the same company that hosts/maintains the other components of the system 100, described in detail below. In some arrangements, the server 110 may be a remote computing system, such as a cloud computing system. In some arrangements, the server 110 a component of a cloud system. In some arrangements, the server 110 may be hosted or implemented by a third party (e.g., other than the company that monitors/operates the various other components of the system 100).

The system 100 also includes devices for facilitating transactions shown as host devices 300. The host devices 300 may include teller stations (i.e., teller systems), ATMs, POS devices, and the like.

Teller stations may include a variety of components utilized by a teller (i.e., a bank employee) to conduct transactions with or for a customer. For example, a teller station can include one or more cash drawers or cassettes, a cash recycler, receipt validators/printers, a user interface, etc., that enable the teller to conduct transactions such as check cashing, deposits (e.g., of checks or bills), transfers, etc. In some arrangements, teller stations include at least a user interface and a cash recycler configured to receive, store, and/or dispense bills (e.g., currency). For example, a teller may deposit a plurality of bills into a teller station, and teller station may analyze (e.g., for quality/authenticity), count, sanitize, and/or store the bills in a plurality of cassettes. Likewise, teller stations may retrieve stored bills in response to a customer requesting funds (e.g., from the teller) by routing the bills from a cassette and through a bill path, to a bill input/output (I/O) slot.

ATMs may be specialized devices that allow a user (e.g., a customer) to access an account held at a financial institution, such as to deposit, withdraw, or transfer funds, among other functions. Like the teller stations, ATMs may include a user interface and a housing having deposited therein at least one cassette for storing bills; however, in some cases, the housing of an ATM may include multiple cassettes (e.g., for storing separate denominations of bills). When interacting with an ATM, a user may provide account information by inserting or contactlessly providing a bank card and/or may input (e.g., via the user interface) various account details (e.g., username, account number, password, PIN, a biometric identifier, etc.) to access the user's account. If the user wishes to withdraw funds, the user may identify an account to withdraw the funds from and may input a desired withdrawal amount. Upon confirmation/authentication of the user and/or the transaction, ATM may retrieve appropriate bills from the one or more cassettes and may dispense the bills via an I/O slot.

As described herein, both teller stations and ATMs are examples of the host devices 300. In general, the host devices 300 are configured to house and/or utilize one or more universal cassettes 200. Accordingly, it will be appreciated that the host devices 300 described below a can include teller station and ATM, but are not limited to only these devices. Other host devices 300 that utilize universal cassettes 200 are also contemplated by the present disclosure. For example, host devices 300 may also include point-of-sale (POS) systems, cash recyclers (e.g., other than in a teller station), vending machines, or any other device that operates by receiving, storing, and/or dispensing bills. Examples of host devices 300, including teller station(s) and ATM(s), are described in greater detail below with respect to FIG. 3.

In some arrangements, the host devices 300 are structured to receive and store bills in one or more cassettes such as the universal cassettes 200. In some arrangements, the host devices are structured to interface with one or more utility devices shown as utility cassettes 400 or the utility module 500, to perform utility operation(s). The host devices 300 may be communicatively coupled to the universal cassettes 200, the utility cassettes 400, and/or the utility module 500 either directly (e.g., by a wired or wireless connection) or indirectly via the network 105.

As mentioned briefly above, the universal cassettes 200 are devices structured for installation or implementation in the host devices 300, and are configured to receive, store, and/or dispense bills. Accordingly, each of the universal cassettes 200 may include a storage area for holding any number of bills. In some embodiments, each of the universal cassettes 200 may be configured to store a particular denomination of bill (e.g., only $20 bills). For example, the universal cassettes 200 may be preconfigured (e.g., preprogrammed) to be associated with a particular denomination, or may determine an associated denomination of bill during filling or operation. For example, the universal cassettes 200 may detect, via one or more sensors, a denomination of a first bill and may record this denomination. In some embodiments, the particular denomination stored by each of the universal cassettes 200 may be determined by a position (e.g., defined by a physical partition, such as a wall or barrier, or a logical partition within a memory of the respective host device 300) within a host device 300. For example, a universal cassette 200 may be docked in a position associated with a particular denomination within the host device 300. In some embodiments, the universal cassettes 200 may be configured to accept multiple denominations.

The universal cassettes 200 may advantageously be designed to work with a variety of different host devices 300, therefore solving the technical problem of cross-device interoperability. In other words, the universal cassettes 200 may be structured for installation in various types, styles, or models of host devices 300. For example, the universal cassettes 200 may be adapted to be docked in both teller stations and ATMs, and may be swapped between the two types of devices. Additionally, universal cassettes 200 may include a control circuit to perform a variety of functions not typically handled by a cassette (e.g., for an ATM or cash recycler). For example, universal cassettes 200 may be configured to detect a denomination, quality, and/or authenticity of stored bills, and may also track the number (i.e., amount) or fill level of stored bills. In this manner, it can be determined whether universal cassettes 200 are full, nearly-full, empty, or nearly-empty, and one or more automated actions can be initiated. Additional features and components of universal cassettes 200 are described in greater detail with respect to U.S. patent application Ser. No. 17/205,587, incorporated herein by reference in its entirety.

In some embodiments, universal cassettes 200 may be considered "full" if a fill level of the cassette exceeds a first threshold (e.g., a maximum threshold). Likewise, in some embodiments, the universal cassettes 200 may be considered "empty" if a fill level of the cassette exceeds a second threshold (e.g., a minimum threshold). According to various embodiments, the fill level may be a quantity (e.g., a number of bills), a percentage (e.g., a number of bills relative to total capacity), and/or a height of a stack of bills. In some embodiments, both a maximum and minimum threshold may be established for a particular cassette. For example, the "full" threshold for a first universal cassette may be 90% capacity, such that the universal cassette is considered full and in need of replacement or emptying once the fill level of the cassette reaches or exceeds 90%. The "empty" threshold for the first universal cassette may be 10% capacity, such that the universal cassette is considered empty and in need of replacement or refilling once the fill level of the cassette reaches or falls below 10%. In some embodiments, additional thresholds may also be set, such as a third threshold representing "nearly-full" (e.g., >80%) and/or a fourth threshold representing "nearly-empty" (e.g., <20%). Thus, it will be appreciated that full, nearly-full, empty, or nearly-empty may represent any suitable fill level or threshold, and that multiple thresholds may be established for a particular cassette.

Figure 2:
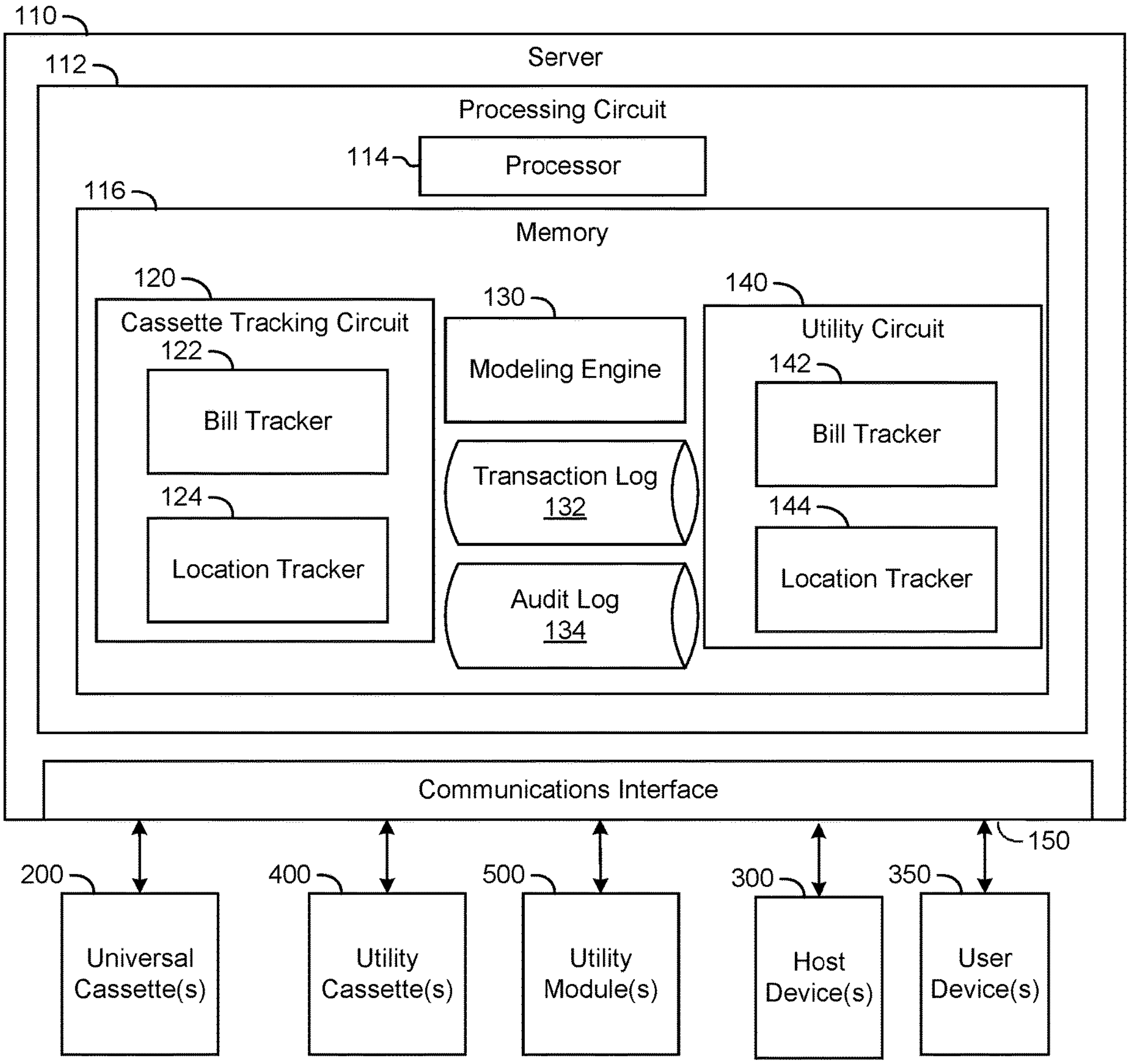
FIG. 2 is a block diagram of a server of the cassette management system of FIG. 1, according to an example arrangement.

FIG. 2 is a block diagram of a server 110 of the cassette management system 100 of FIG. 1, according to an example arrangement. As described briefly above, the server 110 may be a central computing system for a company or institution. In some arrangements, the server 110 is a remote computing system, not physically co-located with the other components of system 100. For example, the server 110 may be a cloud server or other computing device operated (e.g., hosted and/or maintained) by a third party. In some arrangements, the server 110 may be physically located at a central branch of a financial institution (e.g., at a headquarters building) rather than at an individual branch. In some embodiments, however, the server 110 is a central computing device for a single branch or a group of branches of a company or institution. For example, the server 110 may be located at a single branch of a financial institution, and may communicate with equipment local to that branch, and/or at multiple other branches.

The server 110 is shown to include a processing circuit 112 that includes a processor 114 and memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the server 110 is configured to run a variety of application programs and store associated data in a database of the memory 116. In various embodiments, the processor 114 is implemented as a general-purpose processor, an application specific integrated circuit (ASIC), one or more field programmable gate arrays (FPGAs), a digital signal processor (DSP), a group of processing components, or other suitable electronic processing components structured to control the operation of server 110. Memory 116 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application.

Memory 116 is shown to include a cassette tracking circuit 120. The cassette tracking circuit 120 includes a bill tracker 122 and a location tracker 124. Together, the components of cassette tracking circuit 120 are configured to track (i.e., monitor) the fill levels, locations, denominations, and any other suitable parameters of a plurality of universal cassettes (e.g., universal cassettes 200). In particular, bill tracker 122 may be configured to track at least a fill level and a denomination associated with each of a plurality of universal cassettes 200. In some embodiments, bill tracker 122 receives data indicating a fill level and/or a denomination from a universal cassette 200 via a communications interface 150, described in detail below. Specifically, bill tracker 122 may receive fill level and denomination data from universal cassettes 200 at one or more time intervals (e.g., every millisecond, ever second, ever minute, and so on). For example, bill tracker 122 may receive data in response to a query or request for the data (e.g., bill tracker 122 may transmit a prompt to one or more of the universal cassettes 200), at a regularly scheduled time or interval (e.g., ever minute, ever hour, every day, and so on), or continuously (e.g., in real-time, after each transaction, every second, and so on).

Location tracker 124 may be configured to track a location of each of the plurality of universal cassettes 200, by receiving location data from the universal cassettes 200 and/or from a host device 300 associated with a universal cassette 200. Location data may include, for example, a street address, latitude and longitude, information provided by a global positioning system (GPS) transceiver associated with a cassette or host device, or other data that allows server 110 to determine a location of a cassette. In some cases, location data may include identifying information for a host device 300 currently utilizing a universal cassette 200, such as a location, identification number, model number, etc., of the host device 300. The location tracker 124 may receive location data once, or at regular time intervals. For example, the locations of the universal cassettes 200 may be transmitted or requested when a universal cassette 200 is docked or undocked, every 30 seconds, every hour, one per day or week, when a cassette power source (e.g., battery) reaches a predetermined depletion threshold (e.g., 5%, 10%), etc.

As shown, the memory 116 also includes a utility circuit 140. As shown, the utility circuit 140 includes a utility cassette bill tracker 142 and a utility cassette location tracker 144, although one of skill will appreciate that other configurations are contemplated. Together, the components of utility circuit 140 are configured to track (i.e., monitor) the locations, fill levels, status, and any other suitable parameters of a plurality of utility devices (e.g., utility cassettes 400, utility module(s) 500). In particular, the utility cassette bill tracker 142 may be configured to track at least a fill level associated with each of a plurality of utility devices. In some embodiments, the utility cassette bill tracker 142 receives data indicating a fill level from a utility device via a communications interface 150, described in detail below. Specifically, the utility cassette bill tracker 142 may receive fill level from the utility cassettes 400 and/or the utility modules 500 at one or more time intervals (e.g., every millisecond, ever second, ever minute, and so on). For example, the utility cassette bill tracker 142 may receive data in response to a query or request for the data (e.g., utility cassette bill tracker 142 may transmit a prompt to one or more of the utility devices), at a regularly scheduled time or interval (e.g., ever minute, ever hour, every day, and so on), or continuously (e.g., in real-time, after each transaction, every second, and so on). In addition to the fill level, the utility cassette bill tracker 142 may receive information associated with each bill that is stored by or passes through the utility devices such as a denomination, a serial number, a quality, a counterfeit probability rating, and/or any other parameter associated with each of the bills.

The utility cassette location tracker 144 may be configured to track a location of each of the plurality of utility devices, by receiving location data from the utility devices and/or from a host device 300 associated with a utility device. Location data may include, for example, a street address, latitude and longitude, information provided by a global positioning system (GPS) transceiver associated with a cassette or host device, or other data that allows the server 110 to determine a location of a cassette. In some cases, location data may include identifying information for a host device 300 currently utilizing a utility device, such as a location, identification number, model number, etc., of the host device 300. The location tracker 124 may receive location data once, or at regular time intervals. For example, the locations of utility devices may be transmitted or requested when a utility devices is docked or undocked, every 30 seconds, every hour, one per day or week, when a power source (e.g., battery) reaches a predetermined depletion threshold (e.g., 5%, 10%), etc.

In addition to fill levels, denominations, and locations of the universal cassettes 200, the cassette tracking circuit 120 may track (i.e., monitor) various other parameters associated with universal cassettes 200. For example, the cassette tracking circuit 120 and/or the utility circuit 140 may receive/retrieve a battery level, maintenance/repair details, transaction details, bill quality information, user access information, and any other parameters that may be provided by a universal cassette 200, a utility cassette 400 and/or a utility module 500. In some embodiments, transaction details from the host devices 300, the universal cassettes 200, the utility cassettes 400 and/or the utility modules 500 may be used to generate transaction logs 132, stored in a database of memory 116. The transaction logs 132 may include information for each transaction processed by the host device 300, the universal cassettes 200, the utility cassettes 400 and/or the utility modules 500, such as a type of transaction, user identifying information, account identifying information, a number of bills withdrawn/deposited, a time and location of the transaction, bill serial number(s) determined via optical character recognition (OCR), check serial number(s) determined via OCR or magnetic ink character recognition (MICR) for cassettes configured to store checks, and the like.

Similarly, various other parameters/data may be used to generate audit logs 134. The audit logs 134 may include a variety of information that is required for an audit (e.g., of a financial institution) and/or that may aid in the tracking and security of the universal cassettes 200, the utility cassettes 400 and/or the utility modules 500. For example, location data (e.g., including indications of when a universal cassettes 200, a utility cassettes 400 and/or a utility modules 500 is moved), user access data, fill levels, fill/refill times, maintenance/repairs, utility operations, and other information may be recorded via audit logs 134, such that a user (e.g., an auditor, a branch manager, etc.) can access the audit logs 134 at any time to review said information for each of the universal cassettes 200, utility cassettes 400 and/or utility modules 500.

Memory 310 is also shown to include a modeling engine 130, configured to execute predictive models for simulating operations of system 100. Predictive models are generally mathematical representations of various operations of system 100 that, when executed by server 110 using a set of input values, can predict or estimate an output (e.g., a result). For example, a predictive model may be executed to estimate how quickly a universal cassette 200 is filled based on historical transaction or fill level data, a location of the universal cassette 200, etc. Modeling engine 130 may generate and/or execute any type of predictive model, such as neural networks, random forests, decision trees, least squares, etc. Over time, modeling engine 130 may also improve or dynamically update these predictive models as additional data is collected (e.g., by cassette tracking circuit 120 and/or the utility circuit 140).

In some embodiments, modeling engine 130 is configured to predict usage for one or more of universal cassettes 200. For example, based upon a host device 300 that a universal cassette 200 is docked to and/or a location of the universal cassette 200, the modeling engine 130 may be configured to predict how quickly the universal cassette 200 will fill or empty. In this manner, modeling engine 130 may be able to predict and/or generate a projection (schedule) for replacing the universal cassette 200 preemptively (e.g., before it is full or empty).

Likewise, in some embodiments, modeling engine 130 may predict bill requirements based on the location of a host device 300 or a universal cassette 200. For example, modeling engine 130 may analyze historical data to determine that particular location dispenses a particularly high number of $20 bills each day, such that it may be beneficial to increase the frequency with which the universal cassettes 200 at that location are replaced. As another example, historical data may indicate that an ATM at a specific location experiences in influx in transactions on a certain day or weekend (e.g., corresponding to a particular event, such as a fair, a Friday night in a busy area, etc.). Modeling engine 130 may identify these trends and adjust a schedule or frequency with which universal cassettes 200 are replaced/refilled.

The modeling engine 130 may also be structured to predict when a host device 300 requires a utility operation. For example, the modeling engine 130 may be structured to predict that a host device 300 needs a utility operation based on usage of the universal cassettes 200. In this manner, modeling engine 130 may be able to predict and/or generate a projection (schedule) for providing the utility devices to the host devices 300 preemptively. For example, a host device 300 may have a quantity of bills designated as "working cash" for withdrawal transactions. Bills received from a user (e.g., customer) during a deposit transaction may be excluded from the working cash bills until after the deposited bills have been processed by a utility operation. Accordingly, the modeling engine 130 may determine when to provide the utility devices to the host devices 300 such that the host devices 300 have enough "working cash" to continue to perform withdrawal transactions.

Still referring to FIG. 2, communications interface 150 may be configured for transmitting and receiving various data and signals with other components of system 100. As shown, for example, server 110 can communicate with universal cassettes 200, host devices 300, user devices 350, utility cassettes 400 and/or utility modules 500 via communications interface 150. Accordingly, communications interface 150 can include a wireless network interface (e.g., 802.11X, ZigBee, Bluetooth, Internet, etc.), a wired network interface (e.g., Ethernet, USB, Thunderbolt, etc.), or any combination thereof.

The user devices 350 can include, but are not limited to, mobile phones, electronic tablets, laptops, desktop computers, workstations, and other types of electronic devices. More generally, the user devices 350 may include any electronic device that allows a user to interact with the server 110 (e.g., through a user interface). Accordingly, each of the user devices 350 can include an input device (e.g., a keyboard) and an output device (e.g., a screen). In one example, the user device 350 is a computer that provides user access to the operations of the server 110 to allow the user to view operating, transaction, or audit data (e.g., locations and fill levels, predicted future bill requirements, audit logs 134 associated with the universal cassettes 200 and/or the utility devices etc.), change various settings or parameters of server 110, and/or provide user-defined control inputs to control operations of the server 110.

Figure 3:
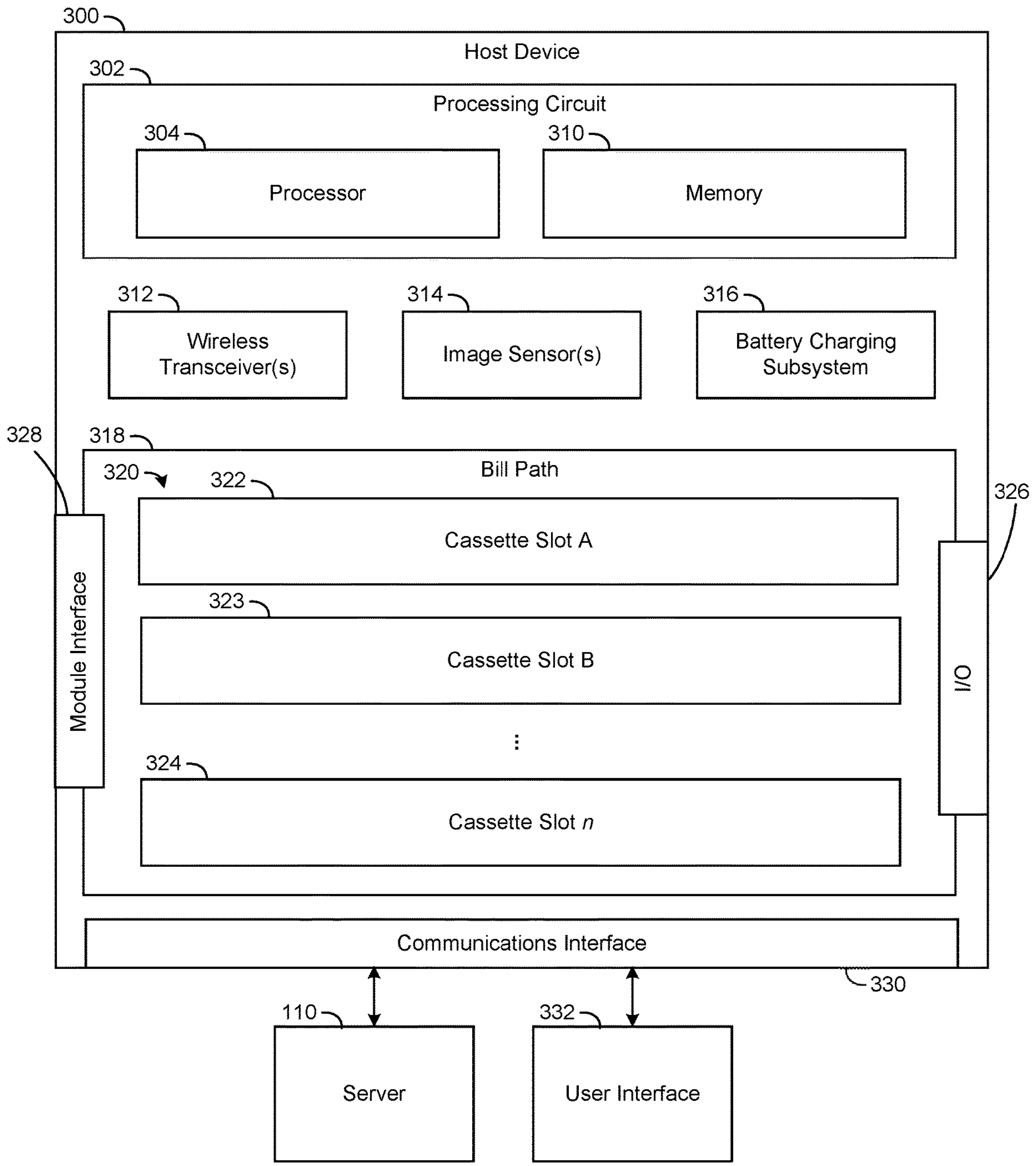
FIG. 3 is a block diagram of a host device for the cassette management system of FIG. 1, according to an example arrangement.

FIG. 3 is a block diagram of a host device 300 for the cassette management system 100 of FIG. 1, according to an example arrangement. As described above, a host device 300 may be any device configured to house and/or utilize universal cassettes 200. The host device 300 may be configured to house and/or utilize the utility cassettes 400. The host device 300 may be configured to couple to and/or utilize the utility modules 500. For example, the host device 300 may represent an ATM, a teller station, a cash recycler, a POS system, a vending machine, or any other device that contains one or more cassettes (e.g., universal cassettes 200) for receiving or dispensing bills.

The host device 300 includes a processing circuit 302. The host device 300 also includes one or more devices shown as wireless transceiver(s) 312, image sensor(s) 314, and a battery charging subsystem 316. The host device 300 also includes a bill path 318 structured to interface with one or more cassette slots 320. For example, the host device 300 may include a first cassette slot shown as "Cassette Slot A" 322, a second cassette slot shown as "Cassette Slot B" 323, and an $n^{th}$ cassette slot shown as "Cassette Slot n" 324. In some arrangements, the host device 300 includes more or fewer of the cassette slots 320 than as shown in FIG. 3. In some arrangements, the bill path is coupled to an input/output device shown as I/O 326. In some arrangements, the bill path is coupled to a module interface 238. The host device 300 also includes a communication interface 330 that is configured for transmitting and receiving various data and signals with other components of system 100. As shown, for example, host device 300 can communicate with at least the server 110 and a user interface 332 via the communications interface 330. Accordingly, communications interface 330 can include a wireless network interface (e.g., 802.11X, ZigBee, Bluetooth, Internet, etc.), a wired network interface (e.g., Ethernet, USB, Thunderbolt, etc.), or any combination thereof.

The processing circuit 302 includes a processor 304 and a memory 310. The memory 310 may be one or more devices (e.g., RAM, ROM, Flash memory, hard disk storage) for storing data and/or computer code for completing and/or facilitating the various processes described herein. The memory 310 may be or include non-transient volatile memory, non-volatile memory, and non-transitory computer storage media. The memory 310 may include database components, object code components, script components, or any other type of information structure for supporting the various activities and information structures described herein. The memory 310 may be communicatively coupled to the processor 304 and include computer code or instructions for executing one or more processes described herein. The processor 304 may be implemented as one or more application specific integrated circuits (ASICs), field programmable gate arrays (FPGAs), a group of processing components, or other suitable electronic processing components. As such, the host device 300 is configured to run a variety of application programs and store associated data in a database of the memory 310.

Host device 300 is also shown to include one or more wireless transceivers 312. Wireless transceivers 312 may include any device configured to transmit and receive wireless data or signals. For example, wireless transceivers 312 may include one or more components for communicating via VHF or UHF radio waves. In some embodiments, wireless transceivers 312 include at least a long-range and a short-range style transceiver, although in other embodiments, wireless transceivers 4312 include either a long or short-range transceiver. In some embodiments, wireless transceivers 312 include at least one of a WiFi, Bluetooth °, or radio-frequency identification (RFID) transceiver. It will be appreciated, however, that wireless transceivers 312 are not limited to just these examples of wireless transceiver devices/technologies, and that any type of wireless transceiver may be included in host device 300. In some embodiments, wireless transceivers 312 may also be coupled to, or a portion of, communications interface 330. For example, the wireless transceivers 312 may be utilized to communicate with other components of system 100 via communications interface 330.

Host device 300 is also shown to include image sensors 314 configured to capture image data. More specifically, image sensors 314 may be configured to read QR codes, barcodes, or other similar identification tags, such as to identify a universal cassette 200 or a utility cassette 400 docked into host device 300 and/or a utility module 500 coupled to an exterior of the host device 300. Accordingly, image sensors 314 may include a light source, one or more lenses, and sensors for receiving optical pulses or other image data. However, image sensors 314 may also include any other components sufficient to read said identification tags. In one example, image sensors 314 include at least a QR code scanner and/or a barcode reader for scanning and interpreting QR codes or barcodes attached to an outer housing/shell of a universal cassette.

By scanning said identification tags, host device 300 may determine that a universal cassette 200, utility cassette 400, and/or utility module 500 is docked and may also determine additional information regarding the universal cassette 200, utility cassette 400, and/or utility module 500. For example, host device 300 may determine an identification code for a universal cassette 200, utility cassette 400, and/or utility module 500, and may transmit the code or send a request to server 110. Server 110 may respond by sending data such as a name or identifier for the universal cassette 200, utility cassette 400, and/or utility module 500, parameters associated with the universal cassette 200, utility cassette 400, and/or utility module 500 (e.g., denomination, fill level, etc.), and any other information related to the identified universal cassette 200, utility cassette 400, and/or utility module 500. In some embodiments, the server 110 may also update a database (e.g., transaction logs 132 and/or audit logs 134) once a notification and/or identification code for a universal cassette 200, utility cassette 400, and/or utility module 500 is received, in order to track the universal cassette 200, utility cassette 400, and/or utility module 500. In some embodiments, to maintain a closed cash cycle within a branch, the server 110 may maintain a database of universal cassette 200, utility cassette 400, and/or utility module 500 cross-referenced to particular allowable locations (e.g., host device identifiers, geographical area, and the like). The host device 300 may be structured to transmit this information, when a particular universal cassette 200, utility cassette 400, and/or utility module 500 is docked, to the server 110, and the server 110 may, based on cross-referencing this information to the database, generate an electronic message to the host device 300 to accept or reject a particular universal cassette 200, utility cassette 400, and/or utility module 500.

Host device 300 is also shown to include a battery charging subsystem 316. Battery charging subsystem 316 may include one or more components configured to charge a battery of a docked universal cassette 200, utility cassette 400, and/or utility module 500. In particular, battery charging subsystem 316 may include an interface or electrical connector for electrically coupling a battery of a universal cassette 200, utility cassette 400, and/or utility module 500 to battery charging subsystem 316, and may also include a circuit for monitoring and controlling the charging of the universal cassette 200, utility cassette 400, and/or utility module 500. For example, battery charging subsystem 316 may include a battery management system (BMS) for monitoring charge levels of each of one or more universal cassettes 200, utility cassettes 400, and/or utility modules 500 docked with the host device 300, and for controlling the charging of the one or more universal cassette 200, utility cassette 400, and/or utility module 500 (e.g., by limiting charge speed and power). It will be appreciated that battery charging subsystem 316 may be an optional component of host device 300 not included in systems where universal cassette 200, utility cassette 400, and/or utility module 500 do not include internal batteries.

As shown, the host device 300 includes a bill path 318. The bill path 318 includes a series of suitable components, such as gears, rollers, belts, motors, tracks, etc., for transporting bills between components of host device 300. Specifically, bills may be transported from/to I/O port 326 to one of a series of cassettes docked into a plurality of cassette slots 320. In some embodiments, the bill path 318 may include at least one sensor structured to detect any of the bill count, denomination, quantity, serial number, etc.

As shown, host device 300 may include any number of cassette slots 320, configured to receive a universal cassette (e.g., one of universal cassettes 200). In other words, a cassette slot may be a "dock" for a universal cassette 200 and/or a utility cassette 400, and may include a series of connections for electronically or communicatively coupling the universal cassette 200 and/or utility cassette 400 to the host device 300. As an example, a universal cassette 200 may be removably docked into a first cassette slot 322, thereby allowing bills to be stored in the docked cassette. A utility cassette 400 may be docked into second cassette slot 323 thereby allowing bills to be received by the utility cassette 400 for a utility operation. In some embodiments, each of cassette slots 320 are associated with a different denomination or type of bill. For example, the first cassette slot 322 may be associated with $10 bills; therefore, a universal cassette docked into the first cassette slot 322 may be configured to store $10 bills either before or during installation.

The I/O port 326 is structured to facilitate transferring bills stored by the host device 300 (e.g., in one or more universal cassettes 200) and an exterior of the host device 300. For example, during a transaction, a user (e.g., a bank customer, a teller, etc.) may insert or withdraw bills from an I/O port 326. I/O port 326 may be a unidirectional or bidirectional port or slot, configured to receive and/or dispense bills. Bills being deposited, for example, may be received via I/O port 326 and may travel along a bill path 318.

The module interface 328 is a physical interface for the utility module 500 to dock or couple to the host device 300. The module interface 328 may facilitate transferring bills stored by the host device 300 (e.g., in one or more universal cassettes 200) and the utility module 500. The module interface 328 may also provide a latching or locking mechanism to secure the utility module 500 to the host device 300. In some arrangements, the module interface 328 is also structured to facilitate wired or wireless communication with the utility module. For example the module interface 328 may provide a wired connection to the utility module 500 and/or facilitate a wireless connection to the utility module 500 via the wireless transceiver(s) 312 and/or the communications interface 330.

The communications interface 330 may be configured for transmitting and receiving various data and signals with other components of system 100. As shown, for example, host device 300 can communicate with the server 110 and/or a user interface 332 via communications interface 150. Accordingly, communications interface 150 can include a wireless network interface (e.g., 802.11X, ZigBee, Bluetooth, Internet, etc.), a wired network interface (e.g., Ethernet, USB, Thunderbolt, etc.), or any combination thereof.

The user interface 332 can include an input device (e.g., a keyboard) and an output device (e.g., a screen) to allow a user to interact with host device 300. In some embodiments, user interface 332 may be part of a user device (e.g., user device 350 of FIG. 2), such as a mobile phone, electronic tablet, laptop, desktop computer, workstation, and other type of electronic device. In other embodiments, user interface 332 is a screen and input device of host device 300 itself. In an example where host device 300 is an ATM, user interface 332 may be a screen of the ATM, a number pad, and/or one or more additional keys for performing various functions, such as completing a transaction. In this example, a user (e.g., a customer) may use user interface 332 to input account information (e.g., a PIN) and transaction information (e.g., a type of transaction, an amount to deposit/withdraw, etc.), as well as to view information such as an account balance.

Figure 4:
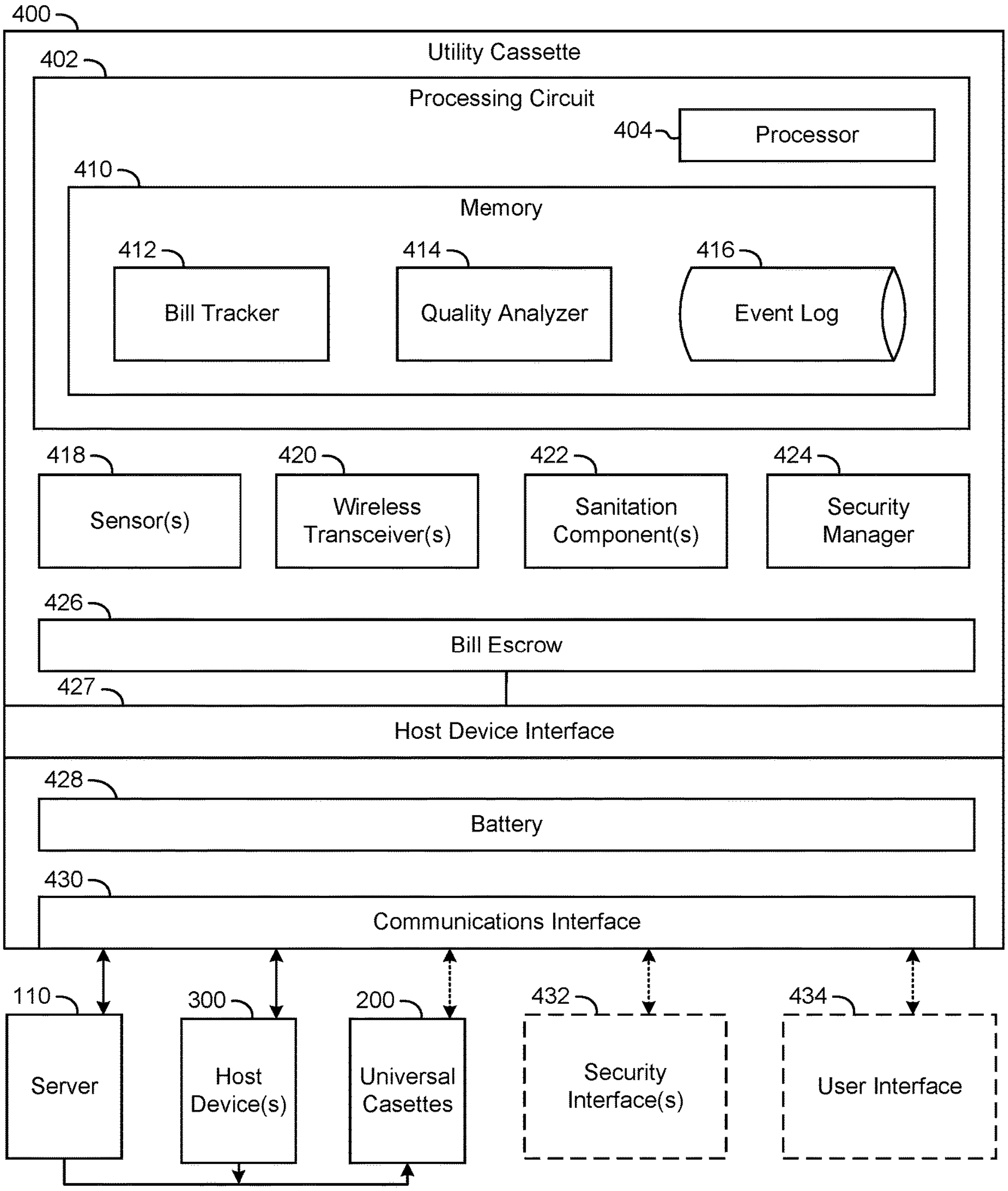
FIG. 4 is a block diagram of a utility cassette for the cassette management system of FIG. 1, according to an example arrangement.

FIG. 4 is a block diagram of a utility cassette 400, which may be used with the cassette management system 100 of FIG. 1, according to an example arrangement. The utility cassette 400 may advantageously be designed to work with a variety of different host devices 300, therefore solving the technical problem of cross-device interoperability. In other words, the utility cassette 400 may be structured for installation in various types, styles, or models of host devices 300. As shown, the utility cassette 400 includes a processing circuit 402, one or more sensors 418, one or more wireless transceivers 420, one or more sanitization components 422, a security manager 424, a bill escrow 426, a host device interface 427, a battery 428, and a communications interface 430. The utility cassette 400 may advantageously be utilized in multiple systems (e.g., ATMs, teller stations, POS systems, etc.) and may also include smart functionality not found in other types of cassettes. For example, utility cassette 400 may be configured to perform one or more utility operations, track a number of stored bills, and/or determine its current location. The utility cassette 400 may also be configured to transmit data associated with the utility operations, stored bills, and/or the current location to the other components of system 100. In some arrangements the data may be used by the system 100 for accurate tracking of the utility cassettes 400 and/or the bills stored in the components of the system 100.

The utility cassette 400 is shown to include a processing circuit 402 that includes a processor 404 and memory 410. Together with the other components of the utility cassette 400, described in detail below, the processing circuit 402, the processor 404, and the memory 410 form at least a portion of a control circuit for utility cassette 400. In some arrangements, the processing circuit 402 is substantially similar or the same as the processing circuit 302 of FIG. 3 and/or the processing circuit 112 of FIG. 2. For example, the processor 404 may be implemented as a general-purpose processor, an application specific integrated circuit (ASIC), one or more field programmable gate arrays (FPGAs), a digital signal processor (DSP), a group of processing components, or other suitable electronic processing components structured to control the operations of the utility cassette 400.

Memory 410 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 410 may be or include volatile memory or non-volatile memory. Memory 410 may include database components, object code components, script components, or any other type of information structure for supporting the various activities and information structures described in the present application. According to an exemplary embodiment, memory 410 is communicatively connected to processor 404 via processing circuit 402 and includes computer code for executing (e.g., by processing circuit 502 and/or processor 404) one or more processes described herein.

Memory 410 is shown to include a bill tracker 412, configured to track a number of bills stored in bill escrow 426 and/or to determine a fill level of the bill escrow 426. In some arrangements, the bill tracker 412 may receive data from one or more sensors 418 that indicates a fill level of the bill escrow 426, and may track the fill level and/or the number of bills over time. In some embodiments, the sensors 418 includes a fill sensor, configured to measure a height of a stack of bills in the bill escrow 426, or to otherwise measure a fill level of the bill escrow 426. In such embodiments, the fill sensor may include one or more switches, an optical sensor, or any other suitable sensor that can determine the fill level or dimensions of the stack of bills in the bill escrow 426. In some embodiments, the sensors 418 can include multiple sensors for both counting a number of bills in the bill escrow 426 and for determining the fill level of the bill escrow 426.

In some arrangements, the utility cassette 400 may advantageously track both the bill count and fill level of the utility cassette 400. The bills may vary in dimensions between locations (e.g., regions, countries, states, climates, etc.), and based on age or quality. For example, worn, old, or used bills may be significantly thicker than brand new bills, meaning that fewer bills can fit in the bill escrow 426. Similarly, bills may be slightly thicker in areas with high humidity when compared to bills in areas of low humidity. Accordingly, a count of the bills as they enter/exit the utility cassette 400 and a fill level of bill escrow 426 can be used together to determine how many bills will fit in the bill escrow 426 and/or to determine when the bill escrow 426 is nearing full or empty.

In some embodiments, the bill tracker 412 may constantly or at least regularly adjust a threshold (i.e., limit) indicating that the bill escrow 426 is full, nearly full, nearly empty, or empty, based on data from the sensors 418. For example, the bill tracker 412 may compare bill counts and fill levels at regular time intervals (e.g., every few minutes, once per day, etc.) to learn the quality and size of the bills in a current location. This knowledge of bill thickness, counts, fill levels, etc., can be used to adjust the threshold for utility cassette 400 in real-time or near real time, allowing the utility cassette 400 to dynamically and accurately track fill levels.

As shown, the memory 410 also includes a quality analyzer 414. The quality analyzer may receive data from the one or more sensors 418 to determine parameters associated with a quality of each bill received by the utility cassette 400. For example, the sensors 418 may detect parameters associated with an age or condition of incoming bills. The quality analyzer 414 may determine a quality of each bill based on the age or condition parameters. In some arrangements, the sensors 418 may detect parameters associated with the authenticity of a bill (e.g., detecting whether the bill includes holograms, raised printing, micro-printing, watermarks, color-shifting inks, and/or any other anti-counterfeiting measures). The quality analyzer 414 may determine whether a bill is authentic or counterfeit based on the authenticity parameters. Quality analyzer 514 may also determine, based on the sensor data, dimensions of the bills (e.g., thickness), which may be used to determine the number of bills that can be stored in the bill escrow 426 before reaching the threshold.

In some arrangements, quality analyzer 414 may determine, based on the sensor data from the sensors 418, that a bill received by the utility cassette 400 is non-recyclable. For example the bill may be physically damaged (e.g., worn, torn, and the like), dirty or not sanitized, or counterfeit. The quality analyzer 414 may generate and transmit an alert to the host device 300 and/or the server 110. The alert may include sensor data from the sensors 418 indicating the parameters detected by the sensors 418. The host device 300 and/or the server 110 may provide an instruction to the utility cassette to perform a utility operation on the bill based on the data received from the quality analyzer 414. For example, the host device 300 and/or the server 110 instruct and/or cause the utility cassette 400 to perform a cleaning operation based on an indication that the bill is not torn or counterfeit. In an additional example, the host device 300 and/or the server 110 may instruct and/or cause the utility cassette to prevent the bill from being recycled and store the bill in the bill escrow 426. In some arrangements, such as when counterfeit bills are detected, the quality analyzer 414 may alert the server 110, which may cause server 110 to save transaction details for additional investigation.

As shown, the memory 410 also includes an event log 416. In some arrangements, the bill tracker 412 may operate cooperatively with the quality analyzer 414 to generate an event log 416. For example the bill tracker 412 and/or the quality analyzer 414 may generate an event report for each bill that is received by the utility cassette 400. The event report may include information associated with each respective bill such as a denomination, a serial number, a quality of the bill, an age of the bill, a authenticity of the bill, an indication of a fill level of or how many bills are stored in the bill escrow 426 when the bill was received, an indication of whether the bill will be stored in the bill escrow 426, and/or any other data associated with the bill and determined by the bill tracker 412 and/or the quality analyzer 414. The event report may then be stored in the event log 416.

In some arrangements, the event log 416 is structured to record transaction and event data. Specifically, event log 416 may store transaction, bill count, fill level, and/or bill quality details, as well as storing records of geographical locations, battery levels, maintenance events, and the like of the utility cassette 400. The event log 416 may act as an audit log for an individual cassette, tracking any and all event that occur before, during, and after installing the utility cassette 400 in a host device 300.

In some embodiments, event log 416 may record a date, time, location, host device identification, and other suitable information each time the utility cassette 400 is docked into a host device 300, or each time the utility cassette 400 is moved. The event log 416 may also record a date, time, location, user ID, and other information each time the utility cassette 400 is accessed by a user, such as to empty or fill the bill escrow 426, or to service the utility cassette 400. For example, a log may be created each time the utility cassette 400 is service, maintained, or calibrated, to ensure that the utility cassette 400 is operating correctly and accurately.

As shown, the utility cassette 400 includes one or more sensors 418. The sensors 418 may include any of a plurality of sensors for measuring various parameters associated with the operations of the utility cassette 400. In some arrangements, the sensors 418 may include an optical sensor or other similar sensor that can count each bill as it is deposited into or retrieved from bill escrow 426. For example, as bills pass the sensors 418, bill tracker 412 may add or subtract from a count of the total number of bills in bill escrow 426. In some arrangements, the sensors 418 include optical sensors or other appropriate sensors that can scan passing bills (e.g., entering the utility cassette 400) to detect counterfeit bills and/or to detect non-recyclable bills (i.e., bills that are too old or worn for recirculation). In some arrangements, the sensors 418 may also be structured to detect whether a bill has recently been cleaned or sanitized. In some arrangements, the sensors 418 are structured to detect a serial number of the bill and the bill tracker 412 and/or the quality analyzer 414 may determine whether the bill has been recently sanitized by a cleaning operation based on the serial number.

In some embodiments, certain sensors 418 may be mounted on, or a part of, host device 300 rather than utility cassette 400. For example, the host device 300 and the utility cassette 400 may share sensor data, allowing the utility cassette 400 to utilize the sensors 418 that are external to the utility cassette 400 to perform its various functions. It will also be appreciated that sensors 418 may include any number of additional sensors not described herein. For example, sensors 418 may also include sensors for detecting a battery level of battery 428 and sensors for identifying bill denominations.

One of skill in the art will appreciate what various embodiments of the utility cassette 400 are contemplated. For example, in some embodiments, certain features of the utility cassette may be part of the host device 300 and/or utility module 500 rather than or in addition to being part of each utility cassette 400. For instance, in some arrangements, the bill escrow 426 may be external to a utility cassette such that the bill escrow 426 is included in the host device 300 and/or utility module 500. In some embodiments, at least two utility cassettes may share a single bill escrow 426. In some embodiments, the processing circuit 402 may, in whole or in part, be included in the server 110, host device 300 and/or utility module 500. In some embodiments, a plurality of cassettes may share the memory 410 and/or processor 404, which may be included in the host device 300 and/or utility module 500. In some embodiments, a plurality of cassettes may share any of the circuitry and data structures shown in FIG. 4, such as the bill tracker 412, quality analyzer 414, and/or event log 416. Accordingly, a unique identifier associated with each particular utility cassette 400 (as described herein with respect to the host device interface 427) may be retrievably stored by any of the shared bill tracker 412, quality analyzer 414, and/or event log 416 such that data may be stored and operating instructions executed by the shared circuit for each particular utility cassette 400.

Still referring to FIG. 4, utility cassette 400 is shown to include one or more wireless transceivers 420. The wireless transceivers 420 are substantially similar to or the same as the wireless transceivers 312 of host device 300. For example, the wireless transceivers 420 may include any device configured to transmit and receive wireless data or signals such as one or more components for communicating via VHF or UHF radio waves. In some arrangements, wireless transceivers 420 include at least a long-range and a short-range style transceiver. In some arrangements, the wireless transceivers 420 include either a long or short-range transceiver. In some arrangements, the wireless transceivers 420 include at least one of a WiFi, Bluetooth®, a cellular, or radio-frequency identification (RFID) transceiver. It will be appreciated, however, that the wireless transceivers 420 are not limited to just these examples of wireless transceiver devices/technologies, and that any type of wireless transceiver may be included in universal cassette 200. In some arrangements, the wireless transceivers 420 may also be coupled to, or a portion of, communications interface 430. For example, a WiFi transceiver may be utilized to communicate with other components of system 100 via communications interface 430.

In some arrangements, the wireless transceivers 420 also include one or more devices or components for detecting a location of the utility cassette 400. For example, the wireless transceivers 420 can include a GPS transceiver configured to detect a geographical location (e.g., latitude and longitude) of utility cassette 400 in real or near-real time. In some embodiments, the wireless transceivers 420 include cellular transceivers for exchanging wireless data with one or more cellular towers. In such embodiments, a location of the utility cassette 400 may be determined based on a nearby tower or towers, such as by using triangulation based on the coordinates of one or more cellular towers. However, in other embodiments, a location of utility cassette 400 is determined based on a connected host device 300. For example, the utility cassette 400 may lack components for determine its location, and may instead determine a location based on the connected host device 300.

In some arrangements, the utility cassette 400 includes sanitation components 422. The sanitation components 422 may include one or more devices for sanitizing or otherwise cleaning incoming or stored bills. For example, sanitation components 422 can include a ultra-violet (UV) light source, such as UV-C LEDs, that may irradiate bills received by the utility cassette 400. The sanitation components 422 may also include other devices such as brushes, filters, or other physical cleaning media to brush contaminants, debris, or other particles off of the bills. In some arrangements, the sanitation components 422 also includes sanitizing fluids (e.g., compressed air, a cleaning solution, a sterilizing solution, an alcohol solution, and/or any other cleaning or sanitizing fluid), a reservoir to store the sanitizing fluid, and hardware for dispensing the sanitizing fluid (e.g., pumps, fluid lines, nozzles, and so on) onto the surface of the bills. In some arrangements, the sanitation components 422 also includes one or more filters, reservoirs, or storage areas for storing dust, debris, used sanitizing fluids, or other materials that are removed from the bills during the cleaning operation. For example, the sanitation components 422 may include a filter to trap dust, a reservoir to store spent sanitizing fluids, and/or a storage area for collecting dust brushed off of the bills. In some arrangements, the sanitation components 422 are generally configured to mitigate against harmful bacteria or viruses that may be present on the surface of bills received by the utility cassette 400. In some arrangements, the sanitation components 422 are coupled to or part of the bill escrow 426 such that bills stored in the bill escrow 426 can be sanitized. In some arrangements, the sanitation components 422 include a separate bill storage area for holding bills in a queue before and/or after the bills are sanitized.

In some arrangements, the sanitation component 422 may include one or more bill smoothing components that are structured to perform smoothing operations on incoming or stored bills. For example, sanitation components 422 can include rollers, presses, and the like to roll and/or press the bills to substantially remove wrinkles, creases, and/or folds from the bills. In some arrangements, the sanitation component 422 may include heating elements to heat the bills to remove wrinkles. For example, the heating elements may heat the presses and/or rollers to facilitate removing wrinkles. In some arrangements, the sanitation component 422 may include a steaming element to pass steam over and/or through the bills to facilitate removing wrinkles. In some arrangements, the smoothing components may be structured to apply a predetermined amount of heat, pressure, steam, or other smoothing element to the bills based on a predetermined smoothing parameter. The smoothing parameter may be determined based on a type of bill (e.g., denomination, currency type, bill material, an age of the bill, and/or other parameters associated with the bill) such that the bill is not damaged by the smoothing operations. In some arrangements, the smoothing parameters is configured such that the bills are substantially smoothed by the smoothing operation without significant risk to permanently damaging the bills (e.g., by damaging outer layers, embossments, raised inking, and/or other features of the bills).

In some arrangements, the sanitation component 422 receives instructions to perform a cleaning operation and/or a smoothing operation on one or more bills received by the utility cassette 400. For example, the sanitation component 422 may receive instructions to perform a cleaning operation and/or a smoothing operation or be caused to perform the cleaning operation and/or the smoothing operation by one or more of the quality analyzer 414, the processing circuit 402, the host device 300, and/or the server 110.

In some arrangements, the smoothing operation is part of the cleaning operation. For example, when the cleaning operation is executed (e.g., by one or more of the quality analyzer 414, the processing circuit 402, the host device 300, and/or the server 110, the smoothing operation may also be executed. In some arrangements, the sanitation components 422 are structured to execute the smoothing operation automatically when a cleaning operation is executed. In some arrangements, the smoothing operation is performed concurrently or partially concurrently. In some arrangements, the smoothing operation is performed sequentially (i.e., before or after) the cleaning operation.

In some arrangements, the instructions to perform the utility operation (including the cleaning operation and/or the smoothing operation) may include transferring only a portion of the bills from all docked cassettes to a utility cassette 400 such that the host device 300 remains operational during the utility operation(s). For example, the instructions provided by the server 110 and/or the host device 300 may be based on the fill level of one or more docked cassettes. The instructions may keep enough bills (e.g., at least 5% of the maximum storage, at least 25% of the maximum storage, and so on) in the docked cassettes to perform normal transactions. In some arrangements, the amount of bills remaining in the docked cassettes for performing transactions may be determined based on a computer generated prediction generated by the modeling engine 130. For example, the modeling engine 130 may generate a statistical prediction of an amount of bills that will be needed throughout the duration of the utility operation(s), and the instructions may be based on the statistical prediction generated by the modeling engine 130.

The security manager 424 may analyze inputs to a security interfaces (e.g., security interface 432) in order to identify users (e.g., attempting to access or manipulate the utility cassette 400) and authorize access. The security manager 424 may be configured to receive user identification data, such as a username, password, PIN, access card number, or other information entered via security interfaces 432 or a user interface (e.g. the user interface 434). As an example, a user may transmit a lock code electronically, via an e-lock on the user's mobile device, to the security interfaces 432. The security manager 424 may interpret the lock code and grant or deny access to the utility cassette 400. In some arrangements, the security manager 424 may communicate (e.g., via the communications interface 430) with server 110 to access a central authentication or access system that maintains user records. For example, the security manager 424 may transmit identifying information for a user attempting to access the utility cassette 400 (e.g., an ID number, a name, etc.) to the server 110, and the server 110 may access an authentication system to verify the user's details. If the user is authenticated, the server 110 may transmit a notification back to utility cassette 400, causing utility cassette 400 to grant the user access.

As shown, the utility cassette 400 includes a bill escrow 426. As described above, the bill escrow 426 is structured to receive, store, and dispense bills that are received by the utility cassette 400. In some arrangements, the bill escrow 426 includes one or more escrow partitions or containers for storing bills. For example, the bill escrow 426 may include a first container for temporarily storing bills before and/or after a utility operation and a second container for storing non-recyclable bills. In some arrangements, the bill escrow 426 only includes a single partition or container for storing bills (e.g., for storing non-recyclable bills). In some arrangements, the bill escrow 426 is coupled to or positioned near the sensors 418 such that the sensors 418 can detect properties of bills received, stored, or dispensed by the bill escrow 426. In some arrangements, the bill escrow 426 is coupled to one or more sanitation components 422 such that the bill escrow 426 can store bills before and/or after a cleaning operation. In some arrangements and as shown in FIG. 4, the bill escrow 426 is coupled to the host device interface 427 such that the bill escrow 426 can selectively receive bills from the host device 300 via the host device interface 427 and selectively store the bills. For example, the bill escrow 426 may be structured to selectively receive and store bills after a quality operation. The quality operation may include determining, by the quality analyzer 414 and/or any other component of the system 100 identifies a bill as being counterfeit or physically damaged based on one or more parameters detected by the sensors 418. The quality operation may also include causing the utility cassette 400 to store the bills in the bill escrow 426 based on the bills being identified as counterfeit or damaged.

The host device interface 427 is structured to facilitate a physical and/or communicative interface between the utility cassette 400 and the host device 300. For example, the host device interface 427 may be structured to interface with one or more of the plurality of cassette slots 320 of the host device 300. In some arrangements, the host device interface is structured to facilitate transferring bills between the utility cassette 400 and the host device 300. In some arrangements, the host device interface 427 is structured to facilitate a communications interface (i.e., communicatively coupling) the utility cassette 400 to the host device 300. In some arrangements, the communications interface is further facilitated by the wireless transceivers 420 and/or the communications interface 430. In some arrangements, the host device interface 427 is structured to include an identifying tag such as an RFID tag, a QR code, or other identifier such that a sensor of the host device (e.g., sensors 314) can detect the host device interface 427 and identify the utility cassette 400. The communications interface and/or the physical interface may be initiated when the host device 300 detects, via the sensors 314, that the utility cassette has been installed into one of the plurality of cassette slots 320.

As briefly mentioned above, the utility cassette 400 may also include a battery 428 for powering the various components of the utility cassette 400. The battery 428 may be any suitable rechargeable or replaceable battery, structured to provide a sufficient amount of power to operate the components of universal cassette 200. For example, the battery 428 may be a rechargeable NiCad, NiMH, or battery. In some embodiments, when the utility cassette 400 is docked into host device 300, battery 428 may be recharged via the battery charging subsystem 316. In other embodiments, the battery 428 is recharged via a separate or external battery charging system. For example, the battery 428 may be recharged when utility cassette 400 is docked into an external refilling/docking station. The battery 428 may be capable of providing power to utility cassette 400 for at least a predetermined amount of time. For example, the battery 428 may be sized to provide at least eight hours of power before being recharged, over even multiple weeks of power. Advantageously, this allows utility cassette 400 to operate without being docked to a host device 300, such as by sending location updates at regular intervals when the utility cassette 400 is in transit.

The utility cassette 400 includes a communication interface 530 configured for transmitting and receiving various data and signals with other components of the system 100. As shown, for example, the utility cassette 400 can communicate with at least the server 110 and the host device 300 via communications interface 530. In some arrangements, the utility cassette 400 can also directly communicate with the universal cassettes 200 stored in the host device 300. In some arrangements the utility cassette 400 indirectly communicates (e.g., via the server 110 and/or the host device 300) with the universal cassettes 200. Accordingly, communications interface 530 can include a wireless network interface (e.g., 802.11X, ZigBee, Bluetooth, Internet, etc.), a wired network interface (e.g., Ethernet, USB, Thunderbolt, etc.), or any combination thereof.

In some arrangements, the utility cassette 400 can alert the server 110 of various operational statuses of the utility cassette 400. For example, the utility cassette 400 can alert the server 110 when a bill the storage of the utility cassette 400 is full, nearly full, nearly empty, or empty, allowing server 110 to automatically identify a replacement utility cassette 400. In another example arrangement, the utility cassette 400 can alert the server 110 when a utility operation has started, is in progress, and/or has completed. In some example arrangements, the utility cassette 400 can alert the server 110 of a battery status (e.g., percentage of battery charge), a sanitation supply (e.g., a supply of sanitation materials for a cleaning operation), and/or any other status of the utility cassette 400.

In some arrangements, the utility cassette 400 may also communicate with additional components such as security interfaces 432 and/or a user interface 434. It will be appreciated, however, that the security interfaces 432 and/or the user interface 434 may be optional components depending on an embodiment of the utility cassette 400. The security interfaces 532 may include any of a number of components or devices for controlling access/entry to utility cassette 400, and in particular to a bill escrow 426 of the utility cassette 400. In particular, the security interfaces 432 may include finger print scanners, a number pad, an electronic lock, an identification card reader, a biometrics scanner, or any other interfaces that allow a user to input security/access information. The security interfaces 432 may operate cooperatively with the security manager 424, described in above, to restrict, track, and/or control access to the utility cassette 400.

In some arrangements, the security interfaces 432 described above include at least a manual or electronic lock configured to restrict access to the bill escrow 426. The utility cassette 400 may remain locked when not docked to a host device 300 to prevent unauthorized access. In some arrangements, the security manager 424 may be configured to track access to the utility cassette 400 and/or the bill escrow 426, such as by determining and recording when a key, access code, etc., is inserted/entered to unlock the utility cassette 400. The security manager 424 may be configured update the event log 416 each time the utility cassette 400 is unlocked, in order to track any opening of the utility cassette 400 or access to bill escrow 426.

The user interface 434 can include an input device (e.g., a keyboard) and an output device (e.g., a screen) to allow a user to interact with the utility cassette 400. For example, the user interface 434 may include a screen and a number or keypad that allows a user to interact directly with utility cassette 400. In some embodiments, one or more components of the user interface 434 may also be utilized as part of the security interface 432. For example, a user may interact with a number pad of user interface 434 to enter a PIN or security access code.

In some embodiments, when not docked into a host device, the utility cassette 400 sends location data and/or a battery level indication to the server 110 at regular intervals. For example, the utility cassette 400 may transmit location and battery data every hour when not connected to a host device 300. In some embodiments, the utility cassette 400 may also transmit a notification to the server 110 when the utility cassette 400 is undocked from a host device 300, and/or when the utility cassette 400 is undocked for a predetermined length of time. For example, the utility cassette 400 may transmit an alert, including at least location data, if the utility cassette 400 is undocked from a host device for more than five minutes.

Figure 5:
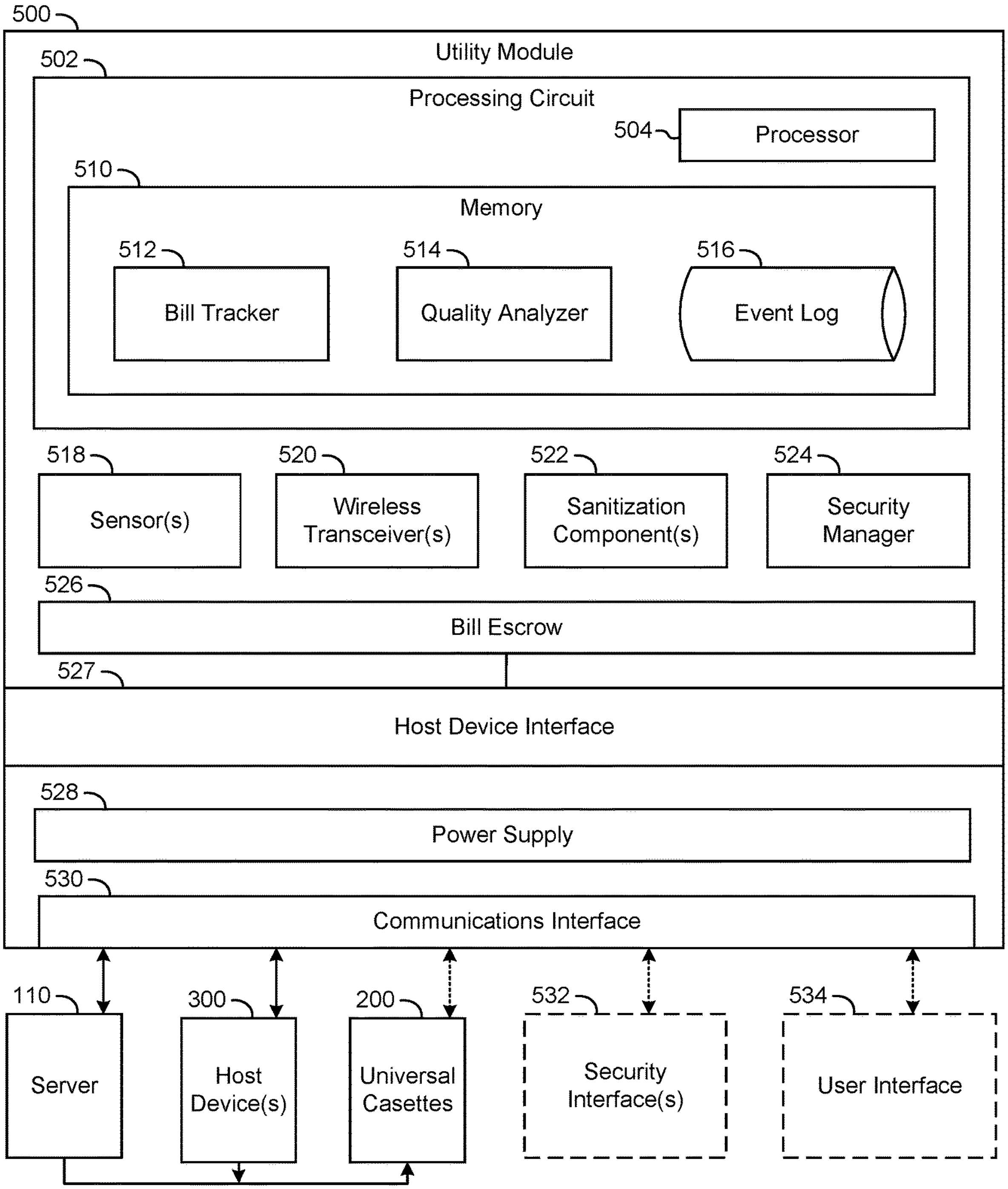
FIG. 5 is a block diagram of a utility module for the cassette management system of FIG. 1, according to an example arrangement.

FIG. 5 is a block diagram of a utility module 500 for the cassette management system 100 of FIG. 1, according to an example arrangement. As shown the utility module 500 includes a processing circuit 502, sensors 518, wireless transceivers 520, sanitation components 522, a security manager 524, a bill escrow 526, a host device interface 527, a battery 528, and a communications interface 530. The utility module 500 may advantageously be utilized in multiple systems (e.g., ATMs, teller stations, POS systems, etc.) and may also include smart functionality not found in other types of cassettes. For example, the utility module 500 may be configured to perform one or more utility operations, track a number of stored bills, and/or determine its current location. The utility module 500 may also be configured to transmit data associated with the utility operations, stored bills, and/or the current location to the other components of system 100. In some arrangements the data may be used by the system 100 for accurate tracking of the utility module 500 and/or the bills stored in the components of the system 100.

According to various example arrangements, the components of the utility module 500 are substantially similar to or the same as the components of the utility cassette 400. That is, the components of the utility module 500 may be substantially similar or the same in structure and/or function as the components of the utility cassette 400. Specifically, the processing circuit 502 is substantially similar to or the same as the processing circuit 402, and the processor 504 and memory 510 are substantially similar to or the same as the processor 404 and memory 410. Similarly, the memory 510 includes a similar bill tracker 512, quality analyzer 514, and event log 516 for tracking bills, analyzing bill quality, and recording transaction and other events for the utility module 500 as described above with respect to the memory 410 the bill tracker 412, the quality analyzer 414, and the event log 416.

The sensors 518 are substantially similar to or the same as the sensors 418 of the utility cassette 400 and may be used to detect one or more parameters of bills received by the utility module 500. The wireless transceivers 520 substantially similar to or the same as the wireless transceivers 420 such that the wireless transceivers 520 can facilitate wireless communication with the devices of the system 100 such as the host device 300 and the server 110. The sanitation components 522 may are substantially similar to or the same as the sanitation components 422 such that the sanitation components 522 can facilitate a cleaning operation for bills received by the utility module 500. In some arrangements, the sanitation components 522 may include one or more smoothing components that are substantially similar to or the same as the smoothing components of the sanitation components 422 such that the sanitation components 522 can perform smoothing operations based on one or more smoothing parameters. The security manager 524 is substantially similar to or the same as the security manager 424 such that the security manager 524 facilitates secure access to the utility module 500. The bill escrow 526 is substantially similar to or the same as the bill escrow 426 such that the bill escrow 526 is structured to selectively receive, store, and/or dispense bills received by the utility module 500.

The host device interface 527 is substantially similar in function to the host device interface 427. For example, the host device interface 527 is structured to facilitate a physical and/or communication interface between the host device 300 and the utility module 500. In some arrangements, the host device interface 527 is structured to facilitate transferring bills between the host device 300 and the utility module 500 (i.e., the physical interface). In some arrangements, the host device interface 527 is structured to facilitate a communicatively coupling the host device 300 and the utility module 500 (i.e., the communication interface).

In some arrangements, the host device interface 527 is structured to interface with the module interface 328 of the host device 300. In some arrangements, the utility module 500 is coupled to the host device 300 via the module interface 328 and the host device interface 527. For example, the utility module 500 may be coupled to an exterior surface of the host device 300 where the exterior surface includes the module interface 328 such that the utility module 500 can interface with the host device 300 without accessing the inside (e.g., bill path and cassette ports) of the host device 300. Accordingly, in some arrangements, the host device interface 527 may include a different structured than the host device interface 427 to allow for the physical interface between the module interface 328 and the host device interface 527.

In some arrangements, the power supply 528 may include a battery that is substantially similar to or the same as the battery 428. In some arrangements, the power supply 528 includes an AC/DC converter structured to receive power from an external power source (e.g., power from a standard wall socket, a high voltage socket, or any standard power source) and convert AC power to DC power to power the components of the utility module 500. In some arrangements, the AC/DC converter is external to the utility module 500. In some arrangements, the AC/DC converter is provided within the utility module 500.

The communications interface 530 is substantially similar to or the same as the communications interface 430 such that the communications interface 530 is structured to facilitate communications with the server 110 and the host device 300. In some arrangements, the communications interface 530 is also structured to facilitate direct communication with the universal cassettes 200. In some arrangements, the communications interface 530 is also structured to facilitate indirect communication with the universal cassettes 200 via the server 110 and/or the host device 300. In some arrangements, the communications interface 530 is also structured to facilitate communications with a security interface 523 and a user interface 534. The security interface 523 and the user interface 534 are substantially similar to or the same as the security interface 423 and the user interface 434, respectively.

Figure 6A:
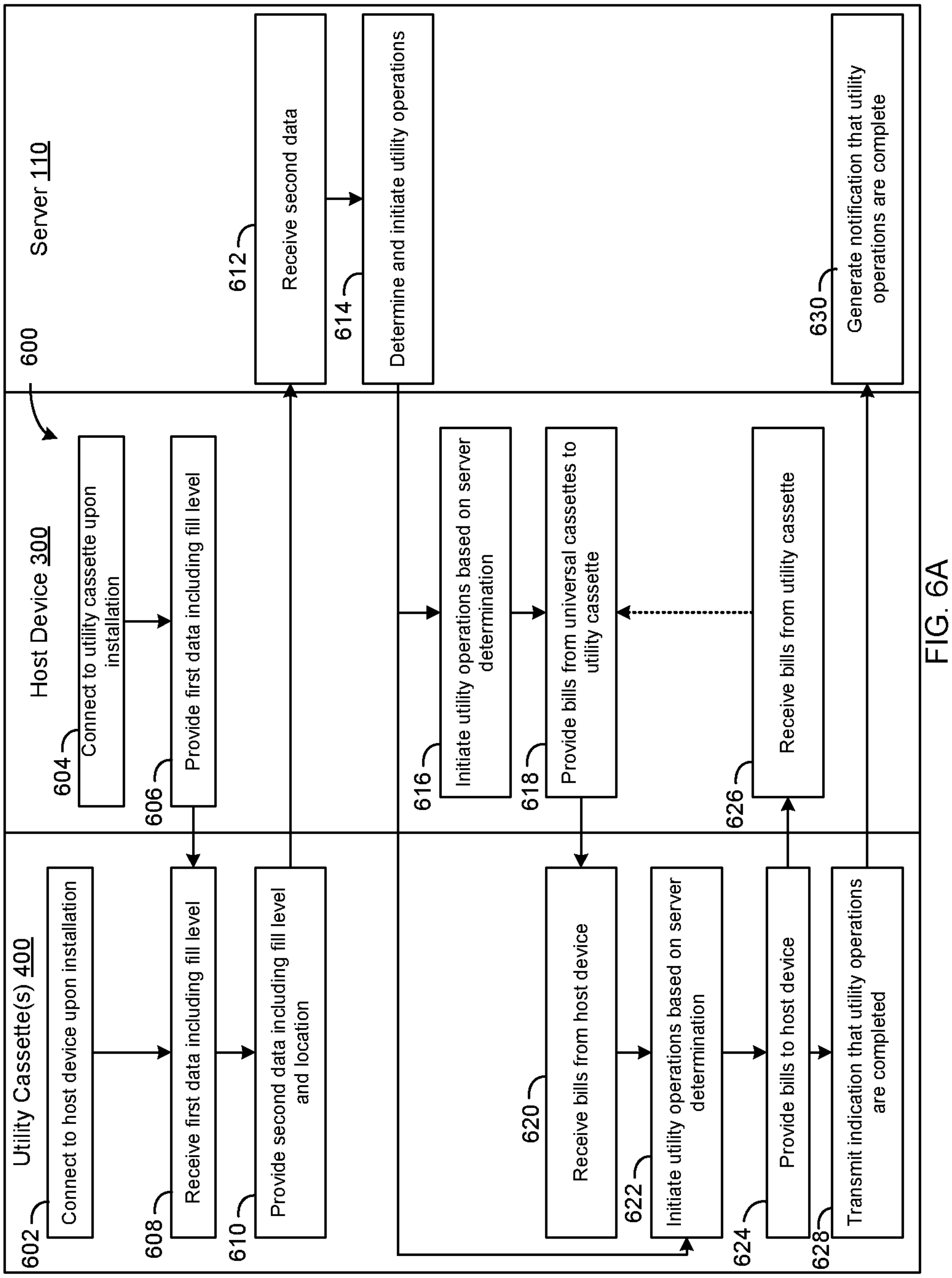
FIG. 6A is a flow diagram illustrating a process for performing utility operations with the utility cassette of FIG. 4 and the cassette management system of FIG. 1, according to an example arrangement.

FIG. 6A is a flow diagram illustrating a process 600 for performing utility operations with the utility cassette 400 of FIG. 4 and the cassette management system 100 of FIG. 1, according to an example arrangement. In some arrangements, the process 600 is implemented by one or more components of the system 100. Specifically, certain steps of the process 600 may be implemented by the server 110, the host device 300, and/or the utility cassette 400. It will be appreciated that certain steps of the process 600 may be optional and, in some arrangements, process 600 may be implemented using fewer than all of the steps. Additionally, one or more of the steps of the process 600 may be implemented by a different component of the system 100 than as shown in FIG. 6A. For example, steps 612 and 614 may be performed by the host device 300 instead of the server 110.

The process 600 may, advantageously, allow for a utility module 500 to perform utility operations such as quality checking and cleaning of bills with minimal manual input. For example, the process 600 may automatically or semi-automatically identify universal cassettes 200 and/or host devices 300 that are in need of a utility operation, based on a parameter such as universal cassette fill level, a predetermined time period, or other predetermined parameter, and alert a user (e.g., a bank employee) to active and/or provide a utility cassette 400. In this regard, the process 600 may ensure that the bills received by the components of the system contain an appropriate number of bills that are suitable for recycling. That is, the bills are clean, free of physical damage, and are unlikely to be counterfeit. The process 600 advantageously reduces interruptions or customer dissatisfaction due to receiving unclean or unsanitary bills, bills which are physically damaged or counterfeit, or otherwise unsatisfactory. The process 600 further advantageously allows for a host device to continue to operate normally while utility operations are performed.

In broad overview of the process 600, at step 602, the utility cassette 400 is connected to the host device 300. At step 604, the host device is connected to the utility cassette 400. At step 606, the host device 300 provides a first data including fill level to the utility cassette 400. At step 608, the utility cassette 400 receives the first data. At step 610, the utility cassette 400 provides a second data including fill level and location to the server 110. At step 612, the server 110 receives the second data. At step 614, the server 110 determines and initiates utility operations. At step 616, the host device 300 initiates utility operations. At step 618, the host device 300 provides bills from the universal cassettes 200 to the utility cassette 400. At step 620, the utility cassette 400 receives the bills form the host device 300. At step 622, the utility cassette 400 intimates the utility operations. At step 624, the utility cassette 400 provides bills to the host device 300. At step 626, the host device 300 receives the bills form the utility cassette 400. At step 628, the utility cassette 400 transmits an indication that the utility operations are completed. At step 630, the server 110 generates a notification that the utility operations are complete.

In some arrangements, the server determination to perform the utility operation (including the cleaning operation) may include instructions to transfer only a portion of the bills from all docked cassettes to a utility cassette 400 such that the host device 300 remains operational during the utility operation(s). For example, the instructions may be based on the fill level of one or more docked cassettes. The instructions may keep enough bills (e.g., at least 5% of the maximum storage, at least 25% of the maximum storage, and so on) in the docked cassettes to perform normal transactions. In some arrangements, the amount of bills remaining in the docked cassettes for performing transactions may be determined based on a computer generated prediction generated by the modeling engine 130. For example, the modeling engine 130 may generate a statistical prediction of an amount of bills that will be needed throughout the duration of the utility operation(s), and the instructions may be based on the statistical prediction generated by the modeling engine 130.

Referring to the process 600 in more detail, at step 602, the utility cassette 400 is connected to the host device 300 when the utility cassette 400 is installed into the host device 300. The utility cassette 400, is structured to physically and communicably couple to the host device 300 to facilitate transferring bills between the utility cassette 400 and the host device 300 and/or to facilitate communication between the utility cassette 400 and the host device 300, as described above with respect to FIG. 4.

Still referring to step 602, in some arrangements, a user (e.g., a bank employee) installs the utility cassette 400 into the host device 300. In some arrangements, the server 110 provides an indication to the user to install the utility cassette 400 based on one or more parameters detected by the host device 300 and/or the universal cassettes 200 such as a fill level, a time period, and/or any other parameter.

At step 604, the host device 300 connects to the utility cassette 400 when the utility cassette 400 is installed into the host device 300. It should be understood that step 604 is substantially similar to step 602 and references the same step of the process 600 from the perspective of the host device 300.

At step 606 the host device 300 provides a first data packet to the utility cassette 400. The first data packet includes an indication of the fill level of one or more universal cassettes 200 in the host device 300. In some arrangements the first data packet includes a number of bills stored in each of the one or more universal cassettes 200. In some arrangements, the first data packet includes a fill level (e.g., empty, nearly empty, full, nearly full, and so on) of the one or more universal cassettes 200. In some arrangements, the first data packet is also transmitted to the server 110.

At step 608, the utility cassette 400 receives the first data packet. In some arrangements, the first data packet is also received by the server 110.

At step 610, the utility cassette 400 provides a second data packet to the server 110. The second data packet includes the fill level from the first data packet and a location of the utility cassette 400. As described above, the location may be determined by one or more sensors of the utility cassette 400 or by the host device 300 transmitting a location data to the utility cassette 400. In some arrangements, the location data is determined by the host device 300 and transmitted to the server 110 by the host device 300.

At step 612 the server 110 receives the second data packet from the utility cassette 400. In some arrangements, the server 110 receives the second data packet from the host device 300. In some arrangements, the host device 300 receives the second data packet from the utility cassette 400.

At step 614, the server 110 determines and initiates utility operations. In some arrangements, the determination may be made based on the second data packet. For example, the server 110 may determine to perform and/or imitate a utility operation based on a fill level and/or location of the host device 300. As described above, the utility operations may include one or more of a cleaning operation and a quality operation. The cleaning operation may include cleaning, by the utility cassette 400, one or more of the bills stored in the host device 300. The quality operation may include detecting one or more parameters of a bill by the sensors 418 and/or the sensors 314, determining a quality the bill based on the parameters, recycling the bill if the parameters are above a quality threshold, and storing the bills if the parameters are below a quality threshold (i.e., damaged, torn, worn, counterfeit, etc.). In some arrangements, the host device 300 determines the utility operations to perform. In some arrangements, the host device 300 is structured to automatically begin one or more of the utility operations responsive to the utility cassette 400 being installed.

The utility operations may be defined by one or more parameters set by the server 110 and/or host device 300. The utility operation parameters may include a number of bills to remove from each of the universal cassettes 200 within the host device 300 such that the host device 300 remains fully operational during the utility operations. In some arrangements, the parameters may specify to perform a utility operation for each of the universal cassettes 200 of the host device 300 sequentially (e.g., one universal cassette 220 at a time). In some arrangements, the parameters may specify to perform a utility operation on a certain number of bills at a time (e.g., independent from the universal cassette 200 from which the bills came). In some arrangements, the parameters may specify to perform the utility operation based on the denomination of the bills. In some arrangements, the parameters may specify to perform a utility operation based on a total value of the bills in the host device 300 (e.g., keeping above 20% of the total value of the bills accessible by the host device 300 during the utility operations). In some arrangements, the parameters may specify to perform a utility operation based on the fill level of each of the universal cassettes 200 (e.g., keeping the fill level for each universal cassette 200 above 20% during the utility operations). In some arrangements, the parameters may specify to perform the utility operation using any combination of the arrangements described above and/or any other arrangement that allows for the host device 300 to remain operational during the utility operations.

At step 616 the host device 300 initiates the utility operations. In some arrangements, the host device 300 initiates the utility operations based on the determination made by the server 110. In some arrangements, the host device 300 determines the utility operations to perform instead of or in addition to the determination made by the server 110. In some arrangements, when the host device 300 determines the utility operations to perform, the host device 300 may verify the utility operations with the server 110.

At step 618, the host device 300 provides bills from the universal cassette 200 to the utility cassette 400. In some arrangements, the host device 300 automatically selects which bills to provide to the utility cassette 400 such that the host device 300 is capable of normal operation (e.g., facilitating transactions for users such as customers, tellers, and the like). In some arrangements, the host device 300 selects bills to provide to the utility cassette 400 based on one or more operational parameters determined at step 614 by the server 110 and/or by the host device 300.

At step 620 the utility cassette 400 receives the bills from the host device 300. The bills are received via the bill path 318 and the host device interface 427. In some arrangements, the utility cassette 400 is structured to temporarily store the bills before performing the utility operations. For example, the utility cassette 400 may store the bills in a queue based on the order in which the bills were received and/or based on one or more parameters of each bill. In some arrangements, the bills may be temporarily stored in the bill escrow 426. In some arrangements, the bills are temporarily stored in another bill storage area of the utility cassette 400.

At step 622, the utility cassette 400 initiates utility operations. In some arrangements, the utility cassette initiates the utility operations based on the determination made at step 614 by the server 110 and/or by the host device 300. In some arrangements, the utility cassette 400 automatically begins utility operations based on receiving bills from the host device (e.g., without instructions from the host device 300 or server 110). As discussed above, the utility operations may include a cleaning operation including cleaning the bills by the sanitation components 422, a smoothing operation including smoothing the bills by the smoothing components, or a quality operation including detecting one or more parameters of each bill, determining whether the parameter is above or below a quality threshold, recycling the bill if the parameter is above the threshold, and storing the bill in the bill escrow 426 if the quality is below the threshold.

At step 624, the utility cassette 400 provides the bills back to the host device 300. In some arrangements, the utility cassette 400 is structured to provide recyclable bills to the host device 300 such that the non-recyclable bills remain in the bill escrow 426.

At step 626, the host device 300 receives the bills from the utility cassette 400. In some arrangements, the host device 300 is structured to mark, flag, or otherwise identify bills that have been through the utility operations. In these arrangements, the host device 300 may prevent the identified bills from returning to the utility cassette 400 within a predetermined time period (e.g., one hour, one day, one week, etc.). In some arrangements, the host device 300 is structured to return to step 618 based on determining that one or more bills have not been through the utility operations. The determination may be made by the host device 300 based on the utility operation started at step 616 not being completed. The determination may be made based on an indication from the server 110 and/or the utility cassette 400 that the utility operations are not completed yet. The determination may be made by the host device 300 based on identifying bills (e.g., by serial number or other parameters) that have not been through the utility operations. In some arrangements, the determination is made based on other data or information received by the host device 300.

At step 628 the utility cassette 400 generates and transmits an indication that the utility operations are completed. The indication may be transmitted to the host device 300 and/or the server 110. The utility cassette 400 may determine that the utility operations are completed based on an a parameter set at step 614 or step 622 indicating when the utility operations are completed, providing bills to the host device 300 at step 624 and not receiving any additional bills form the host device 300, an indication from the host device 300, and/or an indication from the server 110.

At step 630, the server 110 generates and transmits a notification that includes an indication that the utility operations are completed. The server 110 may transmit the notification to a user device 350 and/or to the host device 300. In some arrangements, the notification includes instructions for a user to remove or uninstall the utility cassette 400 from the host device 300.

Figure 6B:
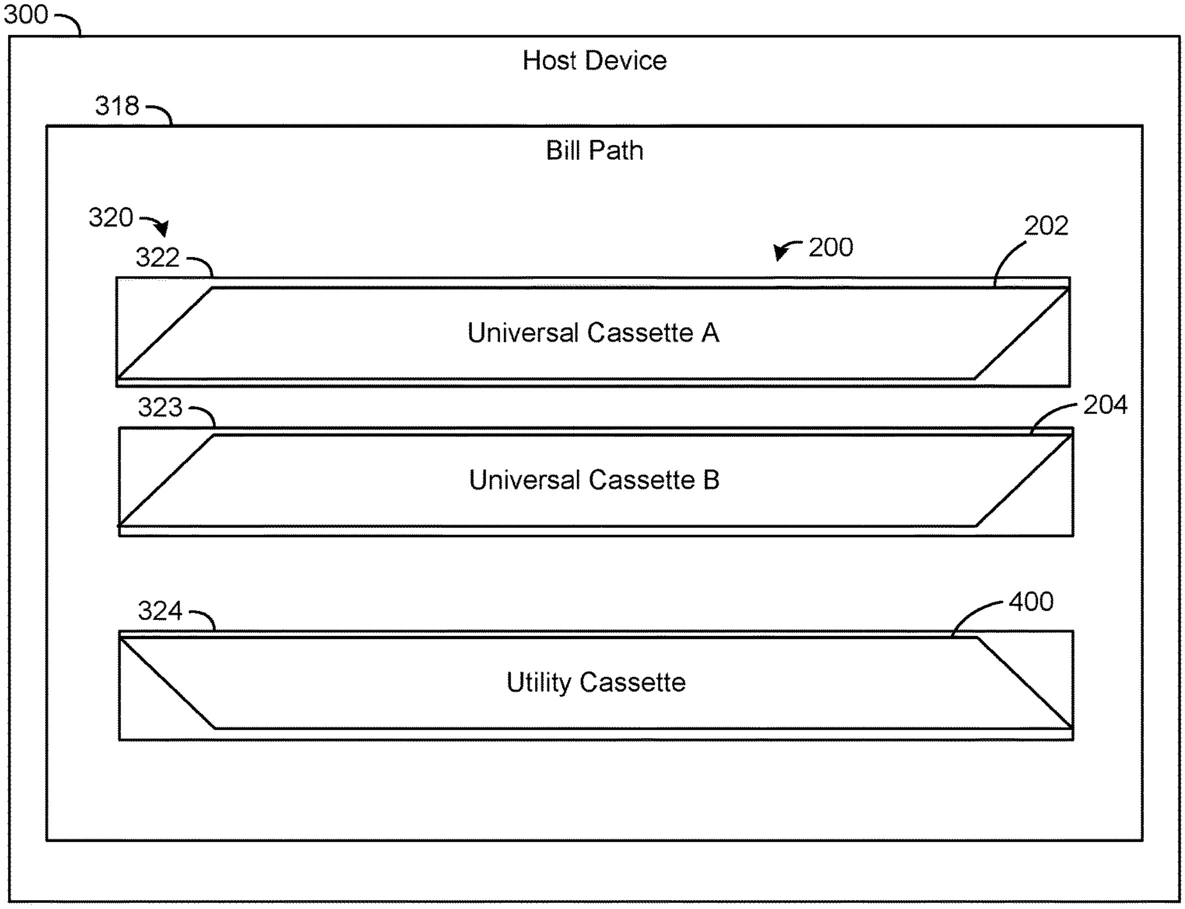
FIG. 6B is a block diagram of the utility cassette of FIG. 4 in use with the host device of FIG. 3, according to an example arrangement.

FIG. 6B is a block diagram of the utility cassette 400 of FIG. 4 in use with the host device 300 of FIG. 3, according to an example arrangement. As sown in FIG. 6B, one or more universal cassettes 200 may be installed in the cassette slots 320. For example and as shown in FIG. 6B, a first universal cassette 202 may be installed in a first cassette slot 322 and a second universal cassette 204 may be installed in a second cassette slot 324. In some arrangements, the cassette slots 320 are each structured to receive a universal cassette 200 and a utility cassette 400.

As discussed above with respect to FIG. 6A, the utility cassette 400 is installed in the host device 300 (e.g., at step 602 and/or step 604 of the process 600). As shown in FIG. 6B, the utility cassette 400 may be installed in one of the cassette slots 320, for example in a third cassette slot 325. When installed in this way, the utility cassette 400 may interface with the bill path 318 to provide and/or receive bills to/from the host device 300. In some arrangements, the utility cassette 400 may perform the process 600 of FIG. 6A when the utility cassette 400 is installed in one of the cassette slots 320.

Figure 7A:
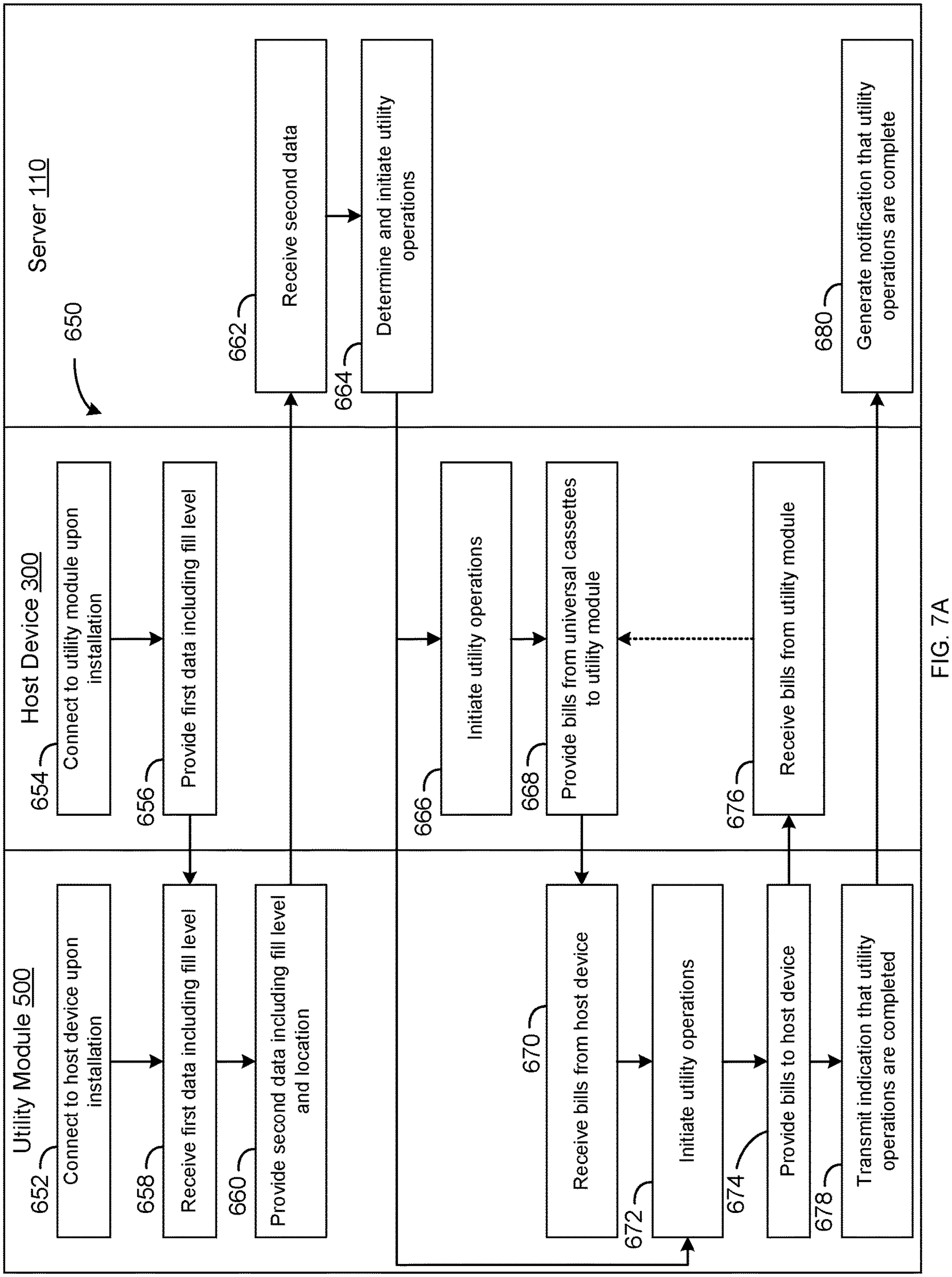
FIG. 7A is a flow diagram illustrating a process for performing utility operations with the utility module of FIG. 5 and the cassette management system of FIG. 1, according to an example arrangement.

FIG. 7A is a flow diagram illustrating a process 650 for performing utility operations with the utility module 500 of FIG. 5 and the cassette management system 100 of FIG. 1, according to an example arrangement. In some arrangements, the process 650 is implemented by one or more components of the system 100. Specifically certain steps of the process 650 may be implemented by the server 110, the host device 300, and/or the utility module 500. It will be appreciated that certain steps of the process 650 may be optional and, in some arrangements, process 650 may be implemented using fewer than all of the steps. Additionally, one or more of the steps of the process 650 may be implemented by a different component of the system 100 than as shown in FIG. 7A. For example, steps 662 and 664 may be performed by the host device 300 instead of the server 110.

The process 650 may advantageously, allow for a utility module 500 to perform utility operations such as quality checking and cleaning of bills with minimal manual input. For example, the process 650 may automatically or semi-automatically identify universal cassettes 200 and/or host devices 300 that are in need of a utility operation, based on a parameter such as universal cassette fill level, a predetermined time period, or other predetermined parameter, and alert a user (e.g., a bank employee) to active and/or provide a utility module 500. In this regard, the process 650 may ensure that the bills received by the components of the system contain an appropriate number of bills that are suitable for recycling. That is, the bills are clean, free of physical damage, and legitimate. The process 650 advantageously reduces interruptions or customer dissatisfaction due to receiving unclean or unsanitary bills, bills which are physically damaged or counterfeit, or otherwise unsatisfactory. The process 650 further advantageously allows for a host device to continue to operate normally while utility operations are performed.

In broad overview of the process 650, at step 652, the utility module 500 is connected to the host device 300. At step 654, the host device is connected to the utility module 500. At step 656, the host device 300 provides a first data including fill level to the utility module 500. At step 658, the utility module 500 receives the first data. At step 660, the utility module 500 provides a second data including fill level and location to the server 110. At step 662, the server 110 receives the second data. At step 664, the server 110 determines and initiates utility operations. At step 666, the host device 300 initiates utility operations. At step 668, the host device 300 provides bills from the universal cassettes 200 to the utility module 500. At step 670, the utility module 500 receives the bills form the host device 300. At step 672, the utility module 500 initiates the utility operations. At step 674, the utility module 500 provides bills to the host device 300. At step 676, the host device 300 receives the bills form the utility module 500. At step 678, the utility module 500 transmits an indication that the utility operations are completed. At step 680, the server 110 generates a notification that the utility operations are complete.

Referring to the process 600 in more detail, at step 652, the utility module 500 is connected to the host device 300 when the utility module 500 is installed into the host device 300. The utility module 500, is structured to physically and communicably couple to the host device 300 to facilitate transferring bills between the utility module 500 and the host device 300 and/or to facilitate communication between the utility module 500 and the host device 300, as described above with respect to FIG. 5.

Still referring to step 652, in some arrangements, a user (e.g., a bank employee) installs the utility module 500 onto the host device 300. In some arrangements, the server 110 provides an indication to the user to install the utility module 500 based on one or more parameters detected by the host device 300 and/or the universal cassettes 200 such as a fill level, a time period, and/or any other parameter.

At step 654, the host device 300 connects to the utility module 500 when the utility module 500 is installed onto the host device 300. It should be understood that step 654 is substantially similar to step 652 and references the same step of the process 650 from the perspective of the host device 300.

At step 656 the host device 300 provides a first data packet to the utility module 500. The first data packet includes an indication of the fill level of one or more universal cassettes 200 in the host device 300. In some arrangements the first data packet includes a number of bills stored in each of the one or more universal cassettes 200. In some arrangements, the first data packet includes a fill level (e.g., empty, nearly empty, full, nearly full, and so on) of the one or more universal cassettes 200. In some arrangements, the first data packet is also transmitted to the server 110.

At step 658, the utility module 500 receives the first data packet. In some arrangements, the first data packet is also received by the server 110.

At step 660, the utility module 500 transmits a second data packet to the server 110. The second data packet includes the fill level from the first data packet and a location of the utility module 500. As described above, the location may be determined by one or more sensors of the utility module 500 or by the host device 300 transmitting a location data to the utility module 500. In some arrangements, the location data is determined by the host device 300 and transmitted to the server 110 by the host device 300.

At step 662 the server 110 receives the second data packet from the utility module 500. In some arrangements, the server 110 receives the second data packet from the host device 300. In some arrangements, the host device 300 receives the second data packet from the utility module 500.

At step 664, the server 110 determines and initiates utility operations to perform. In some arrangements, the determination may be made based on the second data packet. For example, the server 110 may determine to perform and/or imitate a utility operation based on a fill level and/or location of the host device 300. As described above, the utility operations may include one or more of a cleaning operation and a quality operation. The cleaning operation may include cleaning, by the utility module 500, one or more of the bills stored in the host device 300. The quality operation may include detecting one or more parameters of a bill by the sensors 314 and/or the sensors 518, determining a quality the bill based on the parameters, recycling the bill if the parameters are above a quality threshold, and storing the bills if the parameters are below a quality threshold (i.e., damaged, torn, worn, counterfeit, etc.). In some arrangements, the host device 300 determines the utility operations to perform. In some arrangements, the host device 300 is structured to automatically begin one or more of the utility operations responsive to the utility module 500 being installed.

In some arrangements, the server determination to perform the utility operation (including the cleaning operation) may include instructions to transfer only a portion of the bills from all docked cassettes to a utility cassette 400 such that the host device 300 remains operational during the utility operation(s). For example, the instructions may be based on the fill level of one or more docked cassettes. The instructions may keep enough bills (e.g., at least 5% of the maximum storage, at least 25% of the maximum storage, and so on) in the docked cassettes to perform normal transactions. In some arrangements, the amount of bills remaining in the docked cassettes for performing transactions may be determined based on a computer generated prediction generated by the modeling engine 130. For example, the modeling engine 130 may generate a statistical prediction of an amount of bills that will be needed throughout the duration of the utility operation(s), and the instructions may be based on the statistical prediction generated by the modeling engine 130.

According to various example arrangements, the utility operations performed by the utility module 500 and the host device 300 in the process 650 are substantially similar to or the same as the utility operations described above with respect to the process 600 of FIG. 6A. Accordingly the utility operations of the process 650 may be defined by one or more parameters set by the server 110 and/or host device 300 as described above with respect to FIG. 6A.

At step 666 the host device 300 initiates the utility operations. In some arrangements, the host device 300 initiates the utility operations based on the determination made by the server 110. In some arrangements, the host device 300 determines the utility operations to perform instead of or in addition to the determination made by the server 110. In some arrangements, when the host device 300 determines the utility operations to perform, the host device 300 may verify the utility operations with the server 110.

At step 668, the host device 300 provides bills from the universal cassette 200 to the utility module 500. In some arrangements, the host device 300 automatically selects which bills to provide to the utility module 500 such that the host device 300 is capable of normal operation (e.g., facilitating transactions for users such as customers, tellers, and the like). In some arrangements, the host device 300 selects bills to provide to the utility module 500 based on one or more operational parameters determined at step 614 by the server 110 and/or by the host device 300.

At step 670 the utility module 500 receives the bills from the host device 300. The bills are received via the module interface 328 and the host device interface 527. In some arrangements, the utility module 500 is structured to temporarily store the bills before performing the utility operations. For example, the utility module 500 may store the bills in a queue based on the order in which the bills were received and/or based on one or more parameters of each bill. In some arrangements, the bills may be temporarily stored in the bill escrow 526. In some arrangements, the bills are temporarily stored in another bill storage area of the utility module 500.

At step 672, the utility module 500 initiates utility operations. In some arrangements, the utility module 500 initiates the utility operations based on the determination made at step 664 by the server 110 and/or by the host device 300. In some arrangements, the utility module 500 automatically begins utility operations based on receiving bills from the host device (e.g., without instructions from the host device 300 or server 110). As discussed above, the utility operations may include a cleaning operation including cleaning the bills by the sanitation components 522, a smoothing operation including smoothing the bills by the smoothing components, and/or a quality operation including detecting one or more parameters of each bill, determining whether the parameter is above or below a quality threshold, recycling the bill if the parameter is above the threshold, and storing the bill in the bill escrow 526 if the quality is below the threshold.

At step 674, the utility module 500 provides the bills back to the host device 300. In some arrangements, the utility module 500 is structured to provide recyclable bills to the host device 300 such that the non-recyclable bills remain in the bill escrow 526.

At step 676, the host device 300 receives the bills from the utility module 500. In some arrangements, the host device 300 is structured to mark, flag, or otherwise identify bills that have been through the utility operations. In these arrangements, the host device 300 may prevent the identified bills from returning to the utility module 500 within a predetermined time period (e.g., one hour, one day, one week, etc.). In some arrangements, the host device 300 is structured to return to step 668 based on determining that one or more bills have not been through the utility operations. The determination may be made by the host device 300 based on the utility operation started at step 666 not being completed. The determination may be made based on an indication from the server 110 and/or the utility module 500 that the utility operations are not completed yet. The determination may be made by the host device 300 based on identifying bills (e.g., by serial number or other parameters) that have not been through the utility operations. In some arrangements, the determination is made based on other data or information received by the host device 300.

At step 678 the utility module 500 generates and transmits an indication that the utility operations are completed. The indication may be transmitted to the host device 300 and/or the server 110. The utility module 500 may determine that the utility operations are completed based on an a parameter set at step 664 or step 672 indicating when the utility operations are completed, providing bills to the host device 300 at step 674 and not receiving any additional bills form the host device 300, an indication from the host device 300, and/or an indication from the server 110.

At step 680, the server 110 generates and transmits a notification that includes an indication that the utility operations are completed. The server 110 may transmit the notification to a user device 350 and/or to the host device 300. In some arrangements, the notification includes instructions for a user to remove or uninstall the utility module 500 from the host device 300.

Figure 7B:
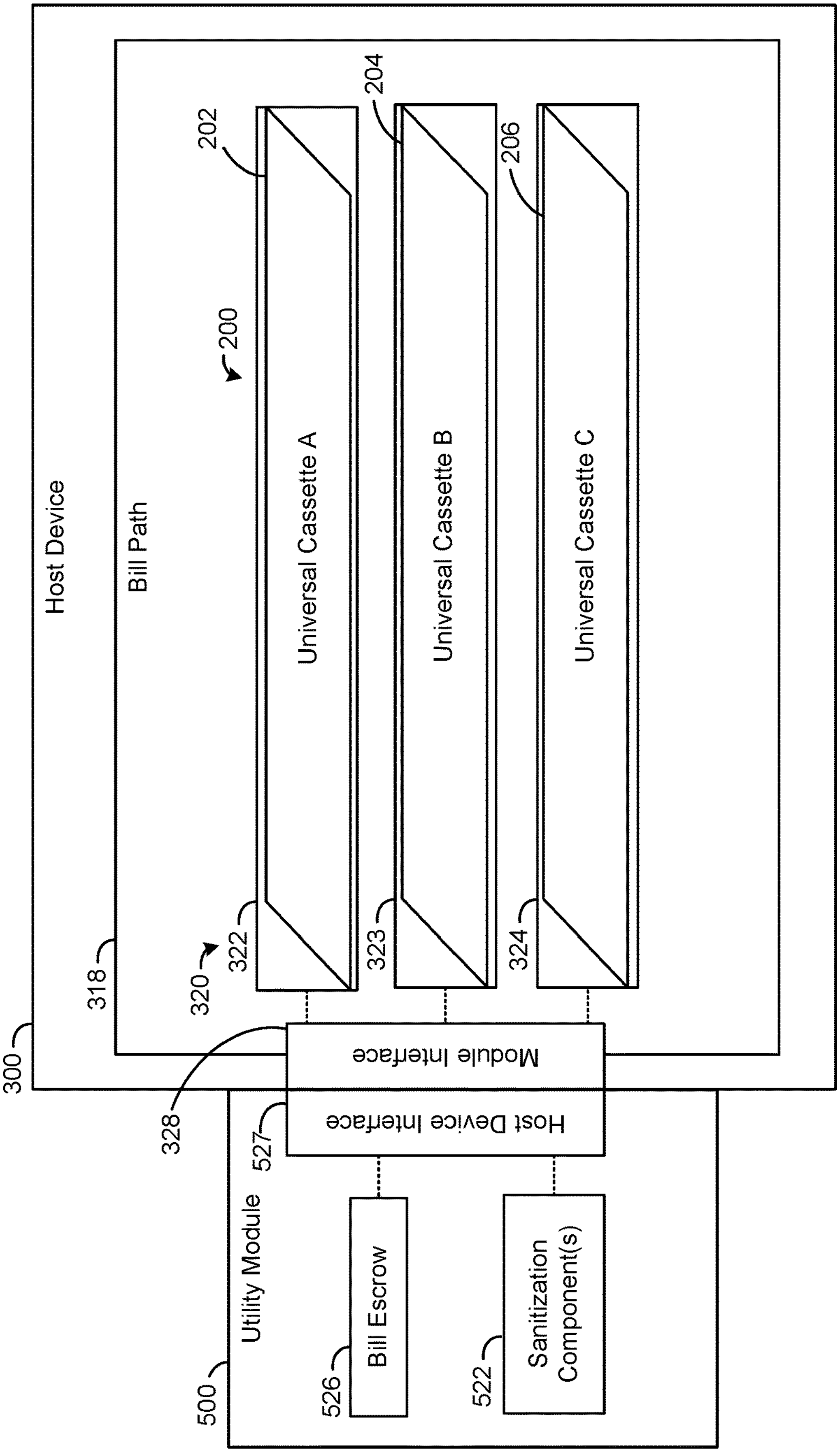
FIG. 7B is a block diagram of the utility module of FIG. 5 in use with the host device of FIG. 3, according to an example arrangement.

FIG. 7B is a block diagram of the utility module 500 of FIG. 5 in use with the host device 300 of FIG. 3, according to an example arrangement. As sown in FIG. 7B, one or more universal cassettes 200 may be installed in the cassette slots 320. For example and as shown in FIG. 6B, a first universal cassette 202 may be installed in a first cassette slot 322, a second universal cassette 204 may be installed in a second cassette slot 324, and a third universal cassette 206 may be installed in a third cassette slot 325.

As discussed above with respect to FIG. 7A, the utility module 500 is installed on the host device 300 (e.g., at step 652 and/or step 654 of the process 650). As shown in FIG. 7B, the utility module 500 may be installed on a side (e.g., top, bottom, left, right, front, back) of the host device 300. In some arrangements, the utility module 500 is installed on the host device 300 such that the host device interface 527 interfaces with the module interface 238, as shown in FIG. 7B. When installed in this way, the utility module 500 may interface with the bill path 318 via the host device interface 527 and/or the module interface 328 to provide and/or receive bills to/from the host device 300. For example, the bill path may transfer bills from one or more universal cassettes 200 to/from the utility module 500 via the host device interface 527 and/or the module interface 328. In some arrangements, the utility module 500 may perform the process 650 of FIG. 7A when the utility module 500 is installed on the host device 300.

In some arrangements, the module interface 328 is structured to directly interface with the universal cassettes 200 (e.g. via the cassette slots 320) such that bills are transferred to the utility module 500 without the use of the bill path 318. In some arrangements, the host device interface 527 is structured to interface with the bill escrow 526 and/or the sanitization components 522 such that the host device interface 527 can transfer bills to/from the bill escrow 526 and/or the sanitization components 522 during the process 650.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A utility device for receiving and dispensing bills, the utility device comprising:

a host device interface structured to couple the utility device to a host device and facilitate transporting the bills between the utility device and the host device;

a cleaning component structured to perform a cleaning operation on one or more bills received by the utility device; and memory having instructions stored thereon that, when executed by one or more processors, cause the one or more processors to perform operations comprising:

receive data regarding the host device comprising fill data regarding a fill level of the host device and a total quantity of bills stored by the host device;

transmit the data regarding the host device to a remote computing device;

cause the host device to transfer the one or more bills to the utility device, wherein a quantity of the one or more bills is less than 80% of the total quantity of bills stored by the host device;

selectively cause the cleaning component to perform the cleaning operation on the one or more bills received by the utility device; and transmit, based on the cleaning operation, a notification to the remote computing device.

2. The utility device of claim 1, wherein the host device remains operational throughout the cleaning operation.

3. The utility device of claim 1, wherein the utility device is one of a utility cassette structured to interface with a cassette interface of the host device or a utility module structured to interface with a module interface of the host device.

4. The utility device of claim 1, wherein the cleaning operation comprises a bill smoothing operation.

5. The utility device of claim 1, further comprising a rechargeable battery, wherein the one or more processors are further configured to transmit a battery level of the rechargeable battery to the remote computing device.

6. The utility device of claim 1, further comprising a sensor structured to detect at least one parameter associated with the one or more bills received by the utility device.

7. The utility device of claim 6, further comprising a bill escrow structured to receive and store the bills within the utility device;

wherein the cleaning operation further comprises:

determining, for each bill of the one or more bills received by the utility device and based on the at least one parameter, whether the at least one parameter for each bill exceeds a parameter threshold;

identifying, based on the at least one parameter exceeding the parameter threshold, a defective bill; and storing the defective bill in the bill escrow.

8. The utility device of claim 7, further comprising a bill tracker configured to determine a fill level of the bill escrow.

9. A method of performing a utility operation, comprising:

receiving data regarding a host device comprising fill data regarding a fill level of the host device and a total quantity of bills stored by the host device;

transmitting the data regarding the host device to a remote computing device;

causing the host device to transfer one or more bills to a utility device, wherein a quantity of the one or more bills is less than 80% of the total quantity of bills stored by the host device;

selectively causing a cleaning component of the utility device to perform a cleaning operation on the one or more bills received by the utility device from the host device; and transmitting, based on the cleaning operation, a notification to the remote computing device.

10. The method of claim 9, further comprising selectively causing the cleaning component to perform a smoothing operation on the one or more bills received by the utility device.

11. The method of claim 9, further comprising receiving, from a sensor of the utility device, at least one parameter regarding the one or more bills received by the utility device.

12. The method of claim 11, further comprising:

determining, for each bill of the one or more bills received by the utility device and based on the at least one parameter, that the at least one parameter for each bill exceeds a parameter threshold;

identifying, based on the at least one parameter exceeding the parameter threshold, a defective bill;

causing the utility device to store the defective bill in a bill escrow; and determining a fill level of the bill escrow based on receiving, from the sensor, information regarding a quantity of bills entering the bill escrow.

13. The method of claim 9, further comprising receiving, from the remote computing device, instructions to perform the cleaning operation;

wherein selectively causing the cleaning component to perform the cleaning operation is responsive to receiving the instructions to perform the cleaning operation.

14. Non-transitory computer readable media having computer-executable instructions embodied therein that, when executed by one or more processors of a computing system, cause the computing system to perform operations comprising:

receiving data regarding a host device comprising fill data regarding a fill level of the host device and a total quantity of bills stored by the host device;

causing the host device to transfer one or more bills to a utility device, wherein a quantity of the one or more bills is less than 80% of the total quantity of bills stored by the host device;

selectively causing a cleaning component of the utility device to perform a cleaning operation on the one or more bills received by the utility device from the host device; and transmitting, based on the cleaning operation, a notification to a remote computing device.

15. The non-transitory computer readable media of claim 14, wherein the operations further comprise:

transmitting the data regarding the host device to the remote computing device; and receiving, from the remote computing device, instructions to perform the cleaning operation;

wherein selectively causing the cleaning component to perform the cleaning operation is responsive to receiving the instructions to perform the cleaning operation.

16. The non-transitory computer readable media of claim 14, wherein the host device remains operational throughout the cleaning operation.

* * * * *